US012664216B2

(12) United States Patent
Albano

(10) Patent No.: US 12,664,216 B2
(45) Date of Patent: Jun. 23, 2026

(54) GRAPHICAL SYSTEM TO REDUCE COGNITIVE COSTS OF OUTSTANDING SUBPORTFOLIO DISCOVERY

(71) Applicant: 49.499.972 Alexandre Luiz Junqueira Hadura Albano, Barueri (BR)

(72) Inventor: Alexandre Luiz Junqueira Hadura Albano, Barueri (BR)

(73) Assignee: 49.499.972 Alexandre Luiz Junqueira Hadura Albano, Barueri (BR)

( * ) Notice: Subject to any disclaimer, the term of this patent is extended or adjusted under 35 U.S.C. 154(b) by 0 days.

(21) Appl. No.: 18/933,206

(22) Filed: Oct. 31, 2024

(65) Prior Publication Data

US 2025/0139167 A1 May 1, 2025

Related U.S. Application Data

(60) Provisional application No. 63/594,478, filed on Oct. 31, 2023.

(51) Int. Cl.
*G06F 16/901* (2019.01)
*G06F 9/451* (2018.01)

(52) U.S. Cl.
CPC .......... *G06F 16/9024* (2019.01); *G06F 9/453* (2018.02); *G06F 16/9027* (2019.01)

(58) Field of Classification Search
CPC ... G06F 16/9024; G06F 9/453; G06F 16/9027

(Continued)

(56) References Cited

U.S. PATENT DOCUMENTS 8,982,129 B1 * 3/2015 Broekhuijsen ...... G06F 16/9024
707/736
10,243,811 B1 3/2019 El Defrawy et al.

(Continued)

OTHER PUBLICATIONS

Ducrou, Jon R.; Eklund, Peter W.; and Wilson, T.: "An intelligent user interface for browsing and search MPEG-7 images using concept lattices", Jan. 2006, https://ro.uow.edu.au/commpapers/2155.

(Continued)

*Primary Examiner* — Phong H Nguyen

(74) *Attorney, Agent, or Firm* — Forsgren Fisher McCalmont DeMarea Tysver; Daniel A. Tysver; James M. Urzedowski

(57) ABSTRACT

A system and method are described that dynamically alter hierarchical data structures displayed on a user interface. The system accesses data associated with a plurality of assets, each having a value and binary attributes, and constructs a directed graph comprising vertices and edges based on those attributes. An active core of the graph is determined by analyzing vertex values and selecting a subset of vertices and edges in accordance with user input. The display is updated to reflect the active core, and edge filters and edge score evaluations (ESEs) are applied to refine the selected edges for inclusion. The transitive edge removal policy (TERP) ensures that undesired transitive edges are removed from the structure. The display dynamically updates over time to reflect changes in the underlying data, enabling users to interact with and modify the graph structure based on new insights and changing conditions.

20 Claims, 28 Drawing Sheets

(58) Field of Classification Search
USPC .......................... 707/736, 769, 797, 798, 805
See application file for complete search history.

(56) References Cited

U.S. PATENT DOCUMENTS

| | | | |
|---|---|---|---|
| 2006/0112108 A1 | 5/2006 | Eklund et al. | |
| 2010/0049766 A1 | 2/2010 | Sweeney et al. | |
| 2010/0185700 A1 | 7/2010 | Bodain | |
| 2012/0290925 A1* | 11/2012 | Atkins | G06F 9/451 |
| | | | 715/243 |
| 2013/0238622 A1 | 9/2013 | Tang | |
| 2017/0154291 A1 | 6/2017 | Dau et al. | |
| 2017/0316265 A1 | 11/2017 | O'Brien et al. | |
| 2017/0316318 A1 | 11/2017 | O'Brien et al. | |
| 2018/0285448 A1 | 10/2018 | Chia et al. | |
| 2020/0335109 A1 | 10/2020 | Galitsky | |
| 2021/0149851 A1* | 5/2021 | Belezko | G06F 16/9024 |
| 2021/0200912 A1* | 7/2021 | Ploegert | G06Q 30/04 |
| 2021/0335505 A1 | 10/2021 | Tedaldi et al. | |
| 2025/0005380 A1* | 1/2025 | Asokan | G06N 5/01 |

OTHER PUBLICATIONS

Gupta, Ravindra K.; et al., "Comparative Study between Traditional and Heuristic Approach on Close-degree Concept Lattice for better Attribute Reduction", International Journal of Advanced Computer Research, vol. 2, Mar. 2012, pp. 37-40.

* cited by examiner

| | Single stock | Dividend payer | >= 4% dividend | >= 6% dividend | Technology | ETF | Hardware | Cloud | USA |
|---|---|---|---|---|---|---|---|---|---|
| Santander | × | × | | | | | | | |
| Allianz | × | × | × | | | | | | |
| British American Tobacco | × | × | × | × | | | | | |
| Invesco NASDAQ 100 ETF | | | | | × | × | | | |
| VanEck Semi-conductor ETF | | | | | × | × | × | | |
| Amazon | × | | | | × | | | × | × |
| Lenovo | × | | | | × | | × | × | |
| Qualcomm | × | | | | × | | × | | × |
| Dell | × | | | | × | | × | × | × |

600

-2.4%
$-21.61

Technology

Single Stock

-7.25%
$-43.48

-1.34%
$-9.41

Dividend
Payer

ETF

610

Hard-
ware

-6.10%

-8.88%

-7.82%
$-31.27

7.29%
$21.87

$-12.21

$-35.51

-9.99%

-8.51%

USA

Cloud

>=4% Div.

$-9.99

$-25.52

-3.87%
$-11.6

-8.70%
$-26.09

10.72%
$21.45

-2.93%

-10.2%

-3.21%

>=6% Div.

$-5.85

$-20.34

$-6.42

17.92%
$17.92

-0.68%
$-0.68

710 etf

|  | Stocks | Bonds | Crypto Assets | Alt Coins | Domestic | Abroad |
|---|---|---|---|---|---|---|
| S&P 500 Index Fund | X |  |  |  | X |  |
| Emerging Markets Bonds |  | X |  |  |  | X |
| Treasury ETF 2-3 Yrs. |  | X |  |  | X |  |
| Bitcoin |  |  | X |  |  |  |
| ETH (Ethereum) |  |  | X | X |  |  |
| Polygon |  |  | X | X |  |  |

3400

3420

9.5%

$47.5

Crypto Assets
3410
29.0%
$42.04 a

Bonds
0.93%
$2.65

Domestic
2.91%
$6.84 b

Alt Coins
3430
33.9%
$13.56

Abroad
-1.15%
$-1.38

3.43%
$3.43

Stocks
2.53%
$3.41

Crypto Assets

3500

3410

29.0%

$42.04

$z = Std\_Dev(x)$

X

3600

$ESE(e) = true\ if\ |y-x| > k * z$ e

Figure 37:
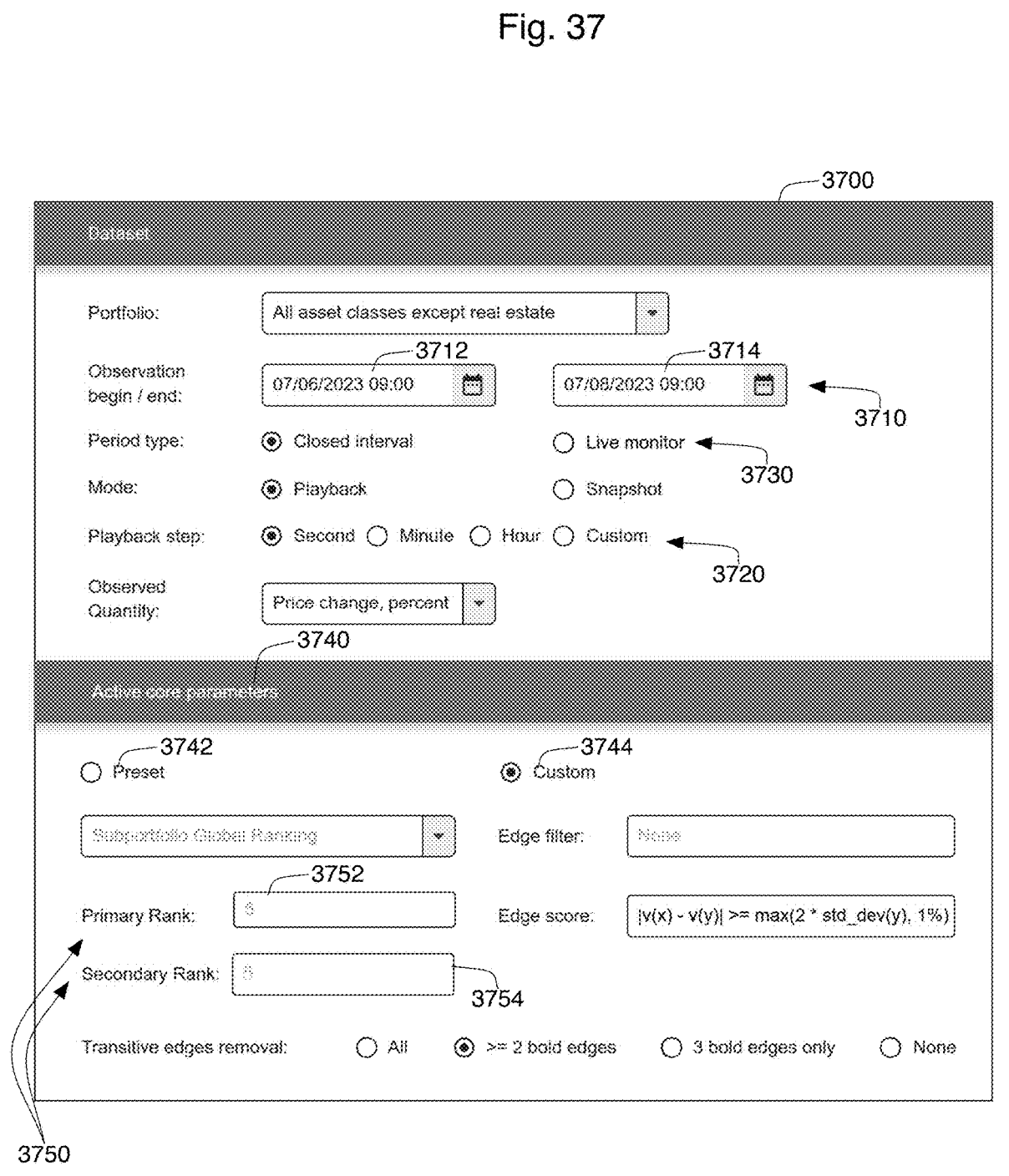

Dataset

Portfolio: All asset classes except real estate

3712 ⎯ 3714

Observation
begin / end: 07/06/2023 09:00          07/08/2023 09:00          3710

Period type: ● Closed interval          ○ Live monitor          3730

Mode: ● Playback          ○ Snapshot

Playback step: ● Second ○ Minute ○ Hour ○ Custom          3720

Observed
Quantity: Price change, percent

3740

Active configuration parameters 3742          3744
○ Preset          ● Custom

Subportfolio Global Ranking          Edge filter: None

3752

Primary Rank:          Edge score: $|v(x) - v(y)| >= max(2 * std\_dev(y), 1\%)$

Secondary Rank:          3754

3750

Transitive edges removal:  ○ All  ● >= 2 bold edges  ○ 3 bold edges only  ○ None

| Constituent | Portfolio Weight | Weight | Return |
|---|---|---|---|
| Allianz | 11.7% | 46.7% | 3.52% |
| British Am. Tob. | 13.4% | 53.3% | 17.92% |
| Total | | | 10.72% |

Fig. 42
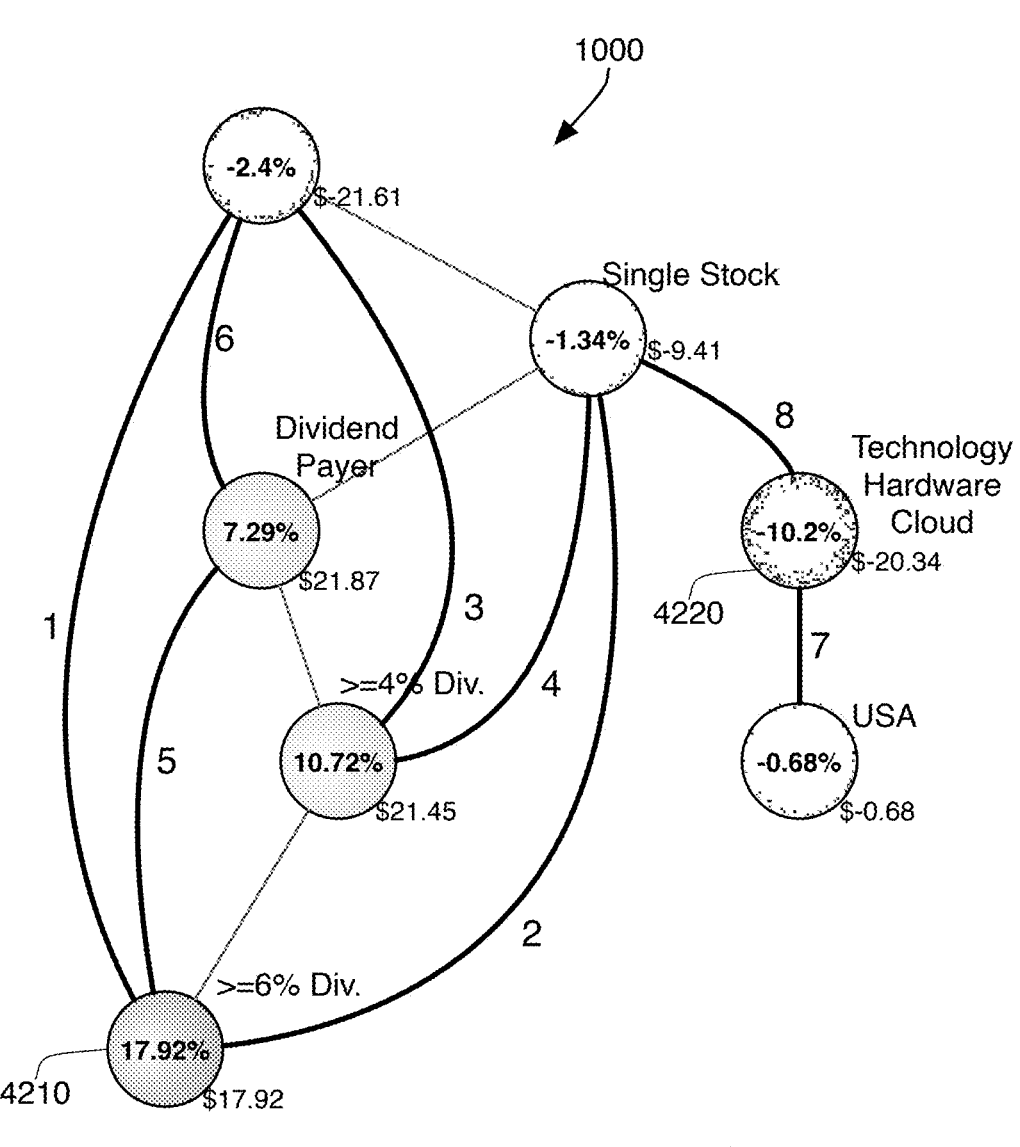
1000
-2.4%
$-21.61
Single Stock
-1.34% $-9.41
6
Dividend
Payer
7.29%
$21.87
8
Technology
Hardware
Cloud
-10.2%
$-20.34
4220
1
3
>=4% Div.
4
7
USA
-0.68%
$-0.68
5
10.72%
$21.45
2
>=6% Div.
17.92%
4210    $17.92
4200
[11-12-2024 09:20] >= 6% div outperforming whole portfolio by 4%
[11-12-2024 09:30] >= 6% div outperforming single stock by 3%
[11-12-2024 14:40] Dividend Payer outperforming whole portfolio by 4%
[11-12-2024 15:40] Cloud, Hardware, Technology underperforming single stock by -5%

GRAPHICAL SYSTEM TO REDUCE COGNITIVE COSTS OF OUTSTANDING SUBPORTFOLIO DISCOVERY

CROSS-REFERENCE TO RELATED CASES

The present application claims the benefit of U.S. Provisional Patent Application No. 63/594,478, filed on Oct. 31, 2023.

TECHNICAL FIELD

The present application relates to the improvement of computer systems. In particular, the current disclosure describes systems and methods for the creation of a new, dynamic user interface for a computer system.

BACKGROUND

Computerized graphics have developed over the years so as to increase the ability to analyze complex numerical statistics more easily in a visual manner. For example, some graphical user interfaces utilize a "concept lattice," which is considered one of the main notions of Formal Concept Analysis. Unfortunately, even computerized user interfaces that use a concept lattice can be confusing and difficult for users to understand and alter. As a consequence, it can be difficult to comprehend underlying data with these prior art technologies.

SUMMARY

The present application describes a system and method for enhancing computer user interfaces by dynamically visualizing and analyzing complex data structures through the concept of an active core. The active core serves as the foundation for displaying interconnected data elements, offering a more insightful and manageable representation of large, hierarchical datasets. User interfaces allow the user to control the currently displayed active core, meaning that the display of the same set of data can be altered according to the current desire of the user.

The present disclosure addresses the challenge of cognitive overload that is found in prior art user interfaces. This is accomplished by selectively pruning the visual structures, ensuring that only the most relevant portions of the data are shown to the user. This is achieved through a highly configurable framework based on three key parameters: Edge Filter, Edge Score Evaluation (ESE), and Transitive Edge Removal Policy (TERP). Together, these parameters determine which data relationships are highlighted, which are reduced in prominence, and which are removed entirely from the interface.

The method underlying the invention revolves around the construction of different types of hierarchical and comparative visual structures, such as Sub-Portfolio Global Rankings (SGR), Comparable Sub-Portfolio Rankings (CSR), and Distinct-Source Comparable Rankings (DCR). Each structure is designed to emphasize specific aspects of the data by adjusting the interplay of the three parameters. This adaptability allows the same dataset to be represented in multiple ways, depending on whether the goal is to focus on detailed hierarchical relationships, extreme global values, or a balanced overview across different data subsets.

The SGR structure focuses on global performance extremes. By limiting the Edge Filter to edges connected to the topmost vertex, the system can use the ESE to isolate the best and worst performing portfolios or data points across the entire dataset. This structure is useful for identifying outliers or conducting portfolio rotations, where the objective is to reallocate investments based on recent trends. Using the TERP to remove all transitive edges ensures that only the most direct and meaningful comparisons are retained, simplifying the visualization.

In contrast, the CSR structure is intended for situations where hierarchical relationships between datasets matter. These relationships determine which vertices are considered comparable. The CSR structure highlights the largest differences between subportfolios and their superportfolios, providing insight into how performance varies within related groupings. In this context, the Edge Filter is applied broadly to all edges, while the ESE selects the most significant performance deviations. TERP can be customized to reduce visual clutter by removing transitive edges, but only if desired, allowing the user to see only the most relevant hierarchical comparisons.

The DCR structure takes a more distributed approach, preventing any one portfolio from dominating the display. This structure ensures that each vertex is connected only to the superportfolio with which it shares the most significant difference, providing a more balanced representation across all data points. The selective Edge Filter used here ensures that only the largest deviation from each superportfolio is highlighted, while the ESE further refines the structure by selecting only the edges with the greatest differences. TERP can again be adjusted to tailor the visual output, either preserving or removing certain connections depending on user preferences.

These three structures-CSR, SGR, and DCR-demonstrate the flexibility and power of the active core framework. Each structure reflects a distinct way of viewing and interacting with data, allowing the system to adapt to different analytical needs. Whether the goal is to explore detailed hierarchical relationships, focus on global outliers, or present a broad, balanced view, the active core ensures that only the most meaningful information is surfaced to the user.

The system is particularly suited for environments where data complexity and volume would otherwise overwhelm traditional user interfaces. By using the active core to prune unnecessary elements and adjust visual hierarchies, the system empowers users to engage with large datasets more effectively, making connections and insights that would otherwise remain hidden. The method also accommodates real-time and playback monitoring, further enhancing its utility for dynamic data environments, such as financial markets or other time-sensitive domains.

Ultimately, this invention offers a novel way to visualize complex data by leveraging the unique properties of the active core. Through its modular, parameter-driven design, the system not only enhances usability but also facilitates deeper insights, improving decision-making processes across a wide range of industries. The flexibility of the three parameters ensures that the user interface remains adaptable, whether dealing with financial portfolios, social media metrics, or other datasets requiring sophisticated analysis.

BRIEF DESCRIPTION OF THE DRAWINGS

FIG. 3 is a data table of assets.

FIG. 14 is a schematic view of a DCR structure for use and display by the user interface device.

FIG. 37 is a schematic view of a user interface element.

FIG. 42 is a schematic view of yet another user interface containing a graphical representation of data.

DETAILED DESCRIPTION

System 100

Figure 1:
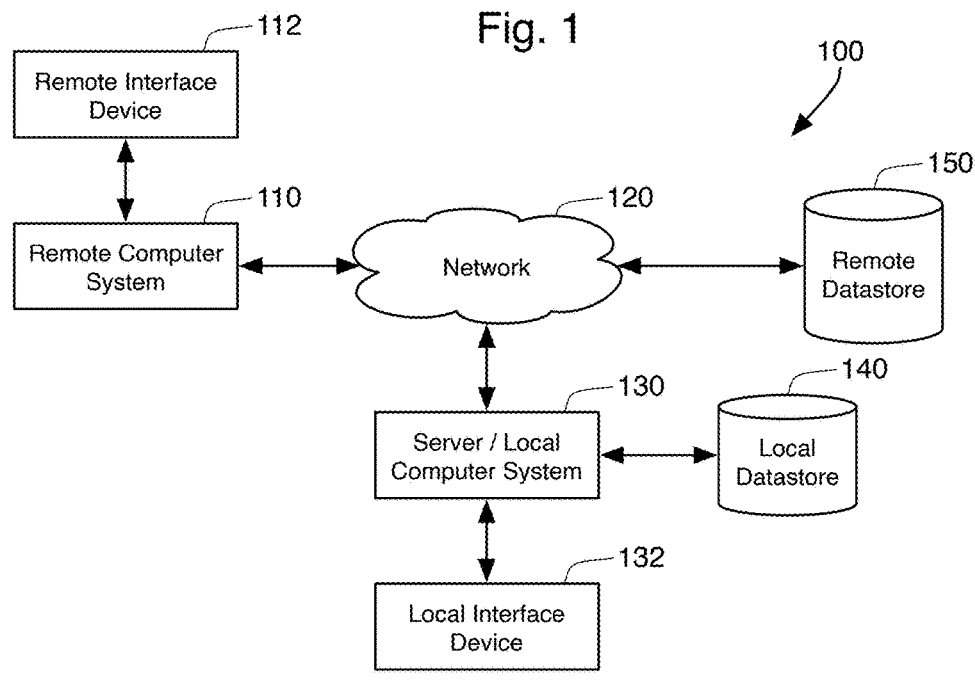
FIG. 1 is a schematic view of a system for performing embodiments of the present invention.

FIG. 1 shows a system 100 for the improvement of computer user interface displays. The system 100 has a remote computer system 110 that communicates over a network 120 with a server 130. Both the remote computer system 110 and the server 130 are computing devices. That means that each device includes a processor for processing computer programming instructions. In most cases, the processor is a CPU, such as the CPU devices created by Intel Corporation (Santa Clara, CA), Advanced Micro Devices, Inc (Santa Clara, CA), or a RISC processor produced according to the designs of Arm Holdings PLC (Cambridge, England). The computing devices 110, 130 may take the form of a standard computer system, such as a laptop or desktop computer, or may take the form of a portable device, such as a tablet computer or smartphone.

These computing devices 110, 130 have memory, which generally takes the form of both temporary, random-access memory (RAM) and more permanent storage such as magnetic disk storage, FLASH memory, or another non-transitory (also referred to as permanent) storage medium. The temporary memory and storage (referred to collectively as "memory") contain both programming instructions and data. In practice, both programming and data will be stored permanently on non-transitory storage devices and transferred into RAM when needed for processing or analysis.

The network 120 can comprise a plurality of different networks or subnetworks, and can be accessed using a variety of techniques and protocols, such as through a local WiFi or Ethernet LAN, or through a cellular data network. In one embodiment, the network 120 includes the Internet.

The remote computer system 110 is responsible for presenting signals to a remote interface device 112, which might take the form of a screen or display that can be viewed by a user. In system 100, it is the server 130 that directs the remote computer system 110 how to generate the signals that appear on the remote interface device 112. For example, the remote computer system 110 may be operating a web browser, and the server 130 may present web pages to the web browser, which then constructs the signals to the remote interface device 112 based on the instructions that make up the web page. In other embodiments, specialized software in the form of an application or app may operate on the remote computer system 110. This application contains instructions for generating the signals presented to the remote interface device 112. These instructions utilize and rely on data signals transmitted over the network 120 from the server 130.

The server 130 can store data in a local datastore 140 and retrieve previously stored data from the local datastore 140. Local datastore 140 contains data relevant to the display presented on remote interface device 112. Although depicted as a separate, single component, datastore 140 may comprise data and data service processors found at a variety of locations. The datastore may be, for example, incorporated into the other components shown in FIG. 1, such as within the server 130. In other embodiments, the server 130 stores data in and retrieves data from a remote datastore 150 that is accessed over network 120. The remote datastore 150 may be a data source that publishes live data to a plurality of end users, such as a stock pricing data source or a live weather data source.

The datastores 140, 150 generally include defined database entities. These entities may constitute database tables in a relational database, or database objects in an object-oriented database, or any other type of database entity usable with a computerized database. In the present embodiment, the phrase database entity refers to data records in a database whether comprising a row in a database table, an instantiation of a database object, or any other populated database entity. Data within the datastores 140, 150 can be "associated" with other data. This association can be implemented using a variety of techniques depending on the technology used to store and manage the database, such as through formal relationships in a relational database or through established relationships between objects in an object-oriented database.

In one embodiment, a local interface device 132 can be used to present data to a user by a computer that is directly connected to the local datastore 140. In FIG. 1, that computer can be the server 130. In other words, the server 130 operates as a server computer when it accesses data from the local datastore 140 and/or the remote datastore 150 and provides information and instructions over the network 120 so that the remote computer system 110 and presents a user interface over remote interface device 112. The same computer can operate as a local computer system 130 when it does not provide data to a remote computer system 110, but instead creates a user interface on its own, directly attached to local interface device 132.

Figure 2:
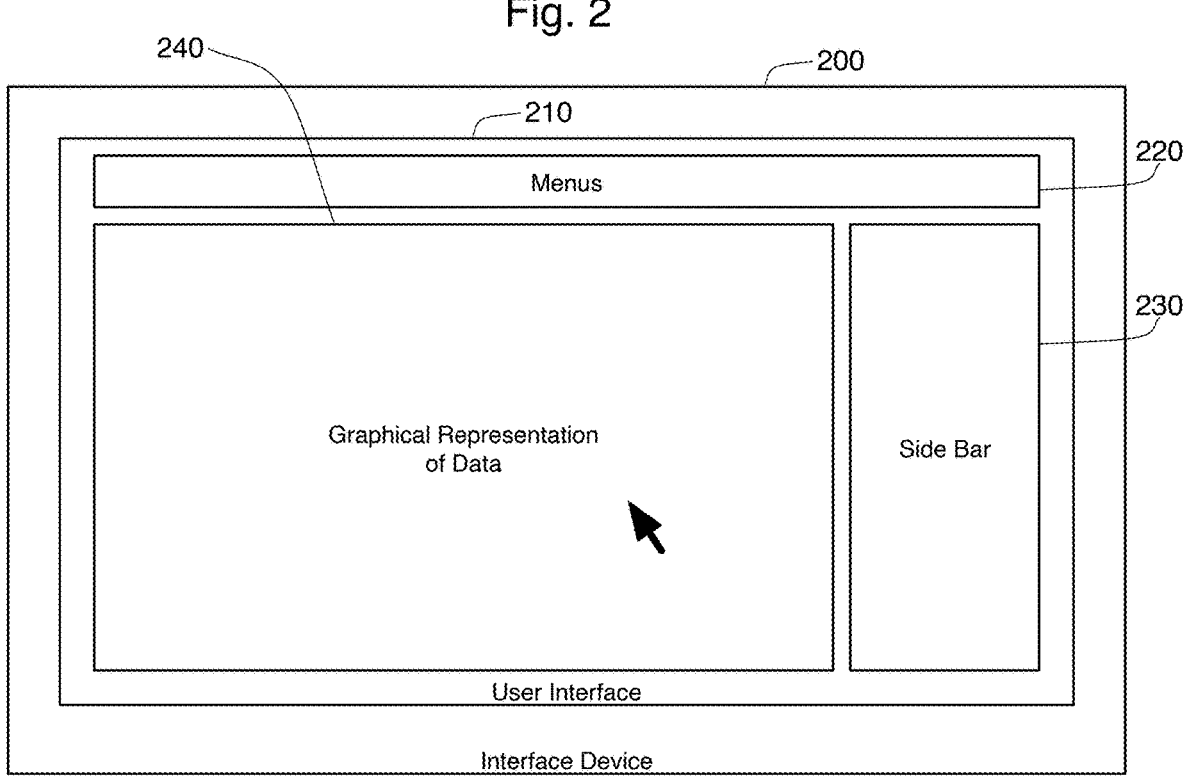
FIG. 2 is a schematic view of a user interface device.

FIG. 2 shows an interface device 200, which could be either the remote interface device 112 or the local interface device 132. The interface device 200 presents information to a user through a user interface 210 that is shown on the interface device 200. In FIG. 2, the user interface 210 contains one or more menus 220, typically found at or near the top of the user interface 210, as well as a side bar 230 containing additional user interface elements, such as sliders, buttons, check boxes, and inspector components. The construction and display of menus and side bars are relatively typical in graphical user interfaces such as user interface 210. The user interface 210 also contains interface element 240, which in the present disclosure is a dynamic, graphical interface element which aids in the presentation and understanding of complex data elements. This interface element 240 is described in further detail below.

Assets and Lattices

The graphical representation of data presented in interface element 240 is best understood through the use of example data. FIG. 3 presents example data 300 in the context of financial assets. The financial context is used for example data because this is a context in which large volumes of data must be understood and displayed. The example data 300 is also useful because the data objects presented have one or more timeseries metrics associated with them, such as the mark-to-market activity metric. Thus, to simplify the technical description of the present improvement to graphical user interfaces, this data 300 will be used.

The example data 300 contains a plurality of rows, with each row defining a separate financial asset 310 (e.g., a stock share, a bond, a gold deposit certificate, etc.), with a label for that asset provided in the first column of that row. In FIG. 3, the rows in example data 300 show the assets that are owned by an individual asset holder, which may be an individual or a corporate entity. At any given time, it is possible to query the price of that asset 310. The price of that asset 310 is therefore time dependent. One may also monitor the change in price, using the moment of acquisition of that asset 310 by the asset holder as a comparison point. This gives rise to the notion called "holding period return", i.e., in how much of a profit, or of a loss, the asset holder currently stands with respect to the asset 310.

Monitoring the return of each individual asset 310 is often a task which is not tractable for human beings. Instead, what organizations often do is to monitor the aggregate return of a portfolio. A portfolio is a logical unit containing assets 310. All of the example data 300 in FIG. 3 might comprise the assets 310 held by a single asset holder, and hence comprise a portfolio for that asset holder.

Each individual asset 310, and even a portfolio of many assets, may be associated with characteristics for that investment, such as asset class, leverage level, currency, risk characteristics, etc. As an illustration, FIG. 3 shows a portfolio of assets 310 that are endowed with binary attributes 320 such as "single stock" (is the asset a single stock, such as AAPL, rather than a grouping of stocks, such as a mutual fund or an ETF), "dividend payer" (does the asset pay a regular dividend), different percentages for dividend (greater than a 4% dividend or greater than 6%), "technology" (is the asset an investment in technology), "ETF" (is the asset an exchange traded fund), "hardware" (is the asset an investment in tech hardware), "cloud" (is the asset an investment in cloud services technology), and "USA" (is the asset based in the USA, or in some circumstances is the asset traded in a USA exchange).

The term portfolio applies to any grouping of assets 310. Thus, FIG. 3 shows the entire set of example data 300, which could be considered a portfolio. But individual subsets of assets 310 can also be considered portfolios. These portfolios can be defined according to certain attributes, such as the binary attributes 320 shown in FIG. 3. For example, "technology" corresponds to a portfolio (or "subportfolio," since it contains a subset of the assets 310 in the portfolio of the entire set of example data 300) comprising assets 310 that are considered technology assets. Portfolios can also be defined according to two or more of these binary attributes 320, such as {"single stock", "technology"}, which identifies the subportfolio of single stocks of technology companies. In this disclosure, set notation (brackets enclosing elements of the set) will be used to define portfolios that are based on multiple ones of the binary attributes 320.

Any table such as the one in FIG. 3 is associated with a hierarchy of subportfolios, and one skilled in the art may recognize that subportfolios are an example of a mathematical structure termed concept lattice. The conceptual hierarchy of subportfolios (i.e., the concept lattice) is always uniquely determined, for any given binary table (such as the one of FIG. 3). By virtue of being uniquely determined, the hierarchy is also called "natural". For this example, the hierarchy of portfolios is shown graphically as a lattice 400 in FIG. 4. Lattice 400 recreates the relationship of the assets 310 defined by the binary attributes 320 in the form of a concept lattice, and hence can be considered a concept lattice structure.

Figure 4:
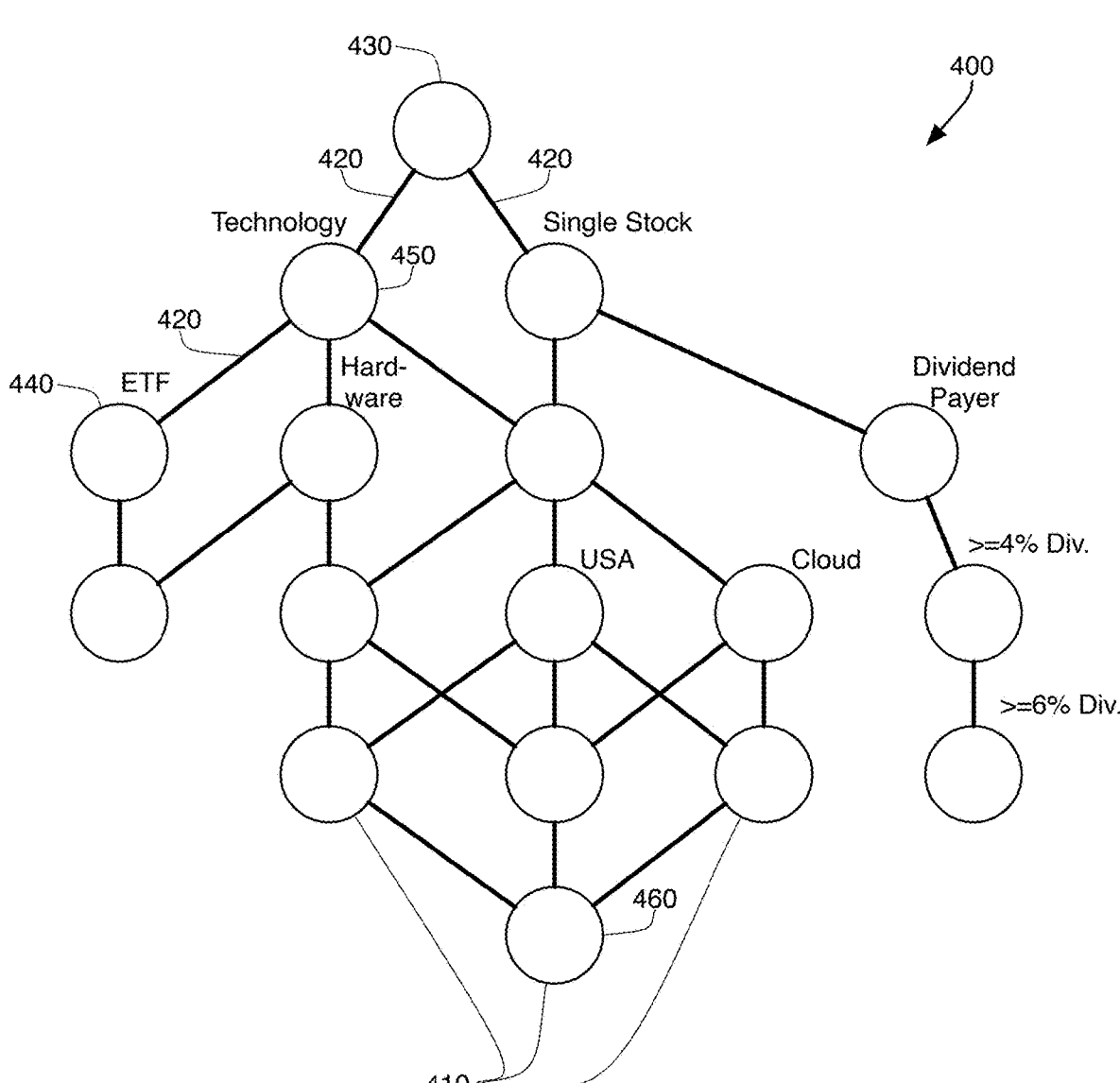
FIG. 4 is a schematic view of a lattice structure.

In FIG. 4, the lattice 400 is drawn as a plurality of vertices 410, which are drawn as circles and represent subportfolios, and a plurality of edges 420, which are drawn as lines that connect the vertices 410. The vertices 410 incident to an edge 420 are also called the endpoints of said edge 420. Each subportfolio or vertex 410 has all the attributes (which are shown above every vertex 410 in FIG. 4) that are present in any upward path (traversing only upward edges) towards the topmost vertex 430. For instance, vertex 440 is labeled with "ETF" in FIG. 4. The only upward path along the edges 420 goes to vertex 450, which is labeled "technology." From vertex 450, the only upward path goes to the topmost vertex 430. Because vertex 440 has all the attributes that are present in any upward path toward the vertex 430, vertex 440 represents the subportfolio {"technology", "ETF"}. In other words, vertex 440 represents all technology related assets that are also ETFs. Although the topmost vertex 430 represents the entirety of the portfolio, it can still be referred to as a subportfolio (as it can be seen as a subportfolio of itself). For another example, consider the vertex 460 depicted at the bottom, center of FIG. 2. It corresponds to the subportfolio {"technology", "single stock", "hardware", "USA", "cloud"}, as all of the upward paths from this vertex 460 pass through other vertices 410 with these labels. Note that in said figure all labels refer to attributes, and assets are apparently hidden.

When A is a subportfolio of B, it is appropriate to say that B is a superportfolio of A. The words "subportfolio", "superportfolio" and "portfolio" actually mean essentially the same. Indeed, any subportfolio is a portfolio when seen in isolation, and as just mentioned, the converse also holds. The words super/subportfolio are used to indicate that the portfolio is considered to be a part of something larger (or something smaller).

A portfolio can be more formally described and/or implemented in data as a triple: one set of objects called assets, a set of attributes and a binary incidence that indicates which attributes are possessed by each asset. Optionally, a portfolio is also accompanied by an assignment called position information, which informs how many units of each asset are present in the portfolio. The data 300 in FIG. 3 shows a portfolio that does not have position information.

Figure 5:
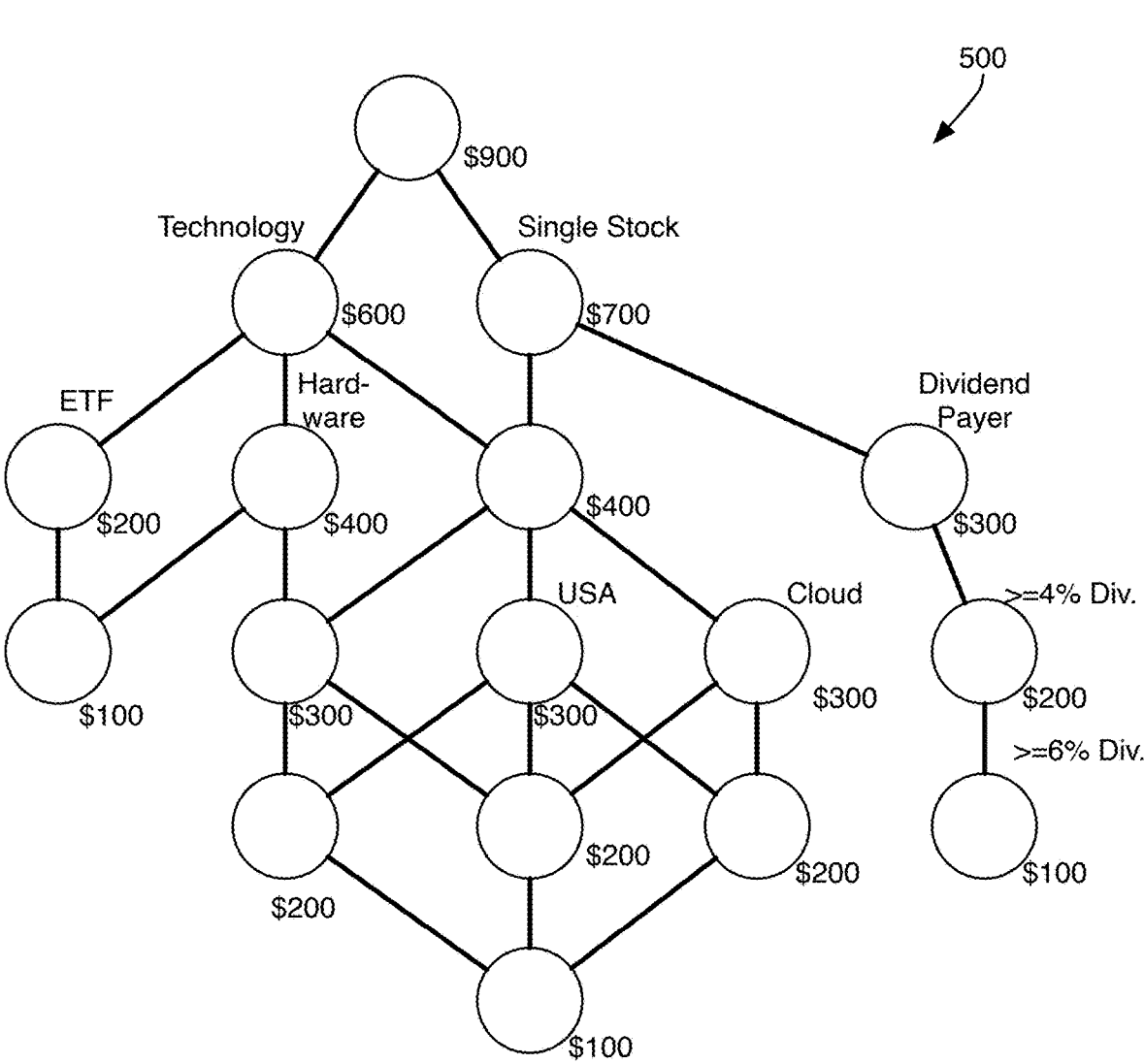
FIG. 5 is a schematic view of a lattice structure with labels and values based on the data table of assets.

One can enrich data from FIG. 3 by adding position information. FIG. 5 shows a lattice 500 representing the same hierarchy of portfolios shown in FIG. 4 with the inclusion of position information. In particular, FIG. 5 contains enriched labeling information that shows that $100 has been invested in each of the nine assets present in example data 300. In other words, each asset 310 starts with an asset value of $100. A useful property of concept lattices is that it is easy to perceive combinations of attributes. For instance, through FIG. 5 it is easy not only to grasp that $600 have been invested in "technology" and $700 in "single stock" assets, but also that precisely $400 have been invested in the combined theme, that is, in the portfolio {"technology", "single stock"}. The dollar values shown in FIG. 5 can be considered vertex values, in that they are the values for the entire vertex based on the individual asset values for the assets that comprise that vertex.

Under the assumption that our investment outlays occurred only once and will not change, FIG. 5 is static: regardless of the dynamic of market prices, that depiction will stay as it is. It is possible to add a time dependence component to this setting. If the system 100 has access to market asset prices, FIG. 6 can show a lattice 600 displaying the hierarchy of portfolios after some defined time period along with profit and loss information.

Figures 6, 7:
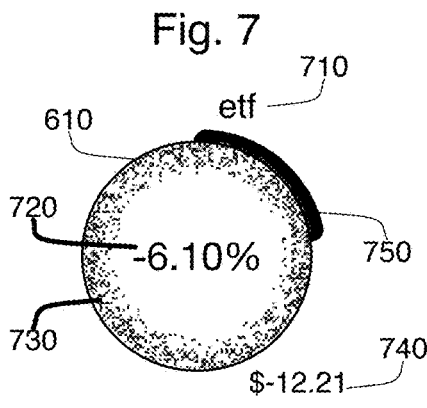
FIG. 6 is a schematic view of a lattice structure including vertex values and color fills.
FIG. 7 is a schematic view of a vertex from FIG. 6.

Each vertex in FIG. 6, such as vertex 610, provides a plurality of different types of information, the details of which are shown in the enlarged vertex 610 shown in FIG. 7. This vertex 610 relates to technology assets with an ETF attribute, which is shown by label 710 in FIG. 7. The primary quantity that is being analyzed over time is presented inside vertex 610. In this case, the analyzed quantity is the relative value change 720 of the portfolio at the end of the period. The jargon term for this is return. Vertex 610 shows a return 720 of –6.1% (or a 6.1% loss).

The vertex 610 is also color coded, such as by including a fill color 730 inside the circle that defines the vertex 610. A red fill color 730 is shown in stipple as opposed to actual color in FIG. 7. In one embodiment, vertices with losses are filled with the color red, and vertices with gains are filled with the color green. Since Vertex 610 shows a loss, it is filled with the color red. The intensity of the color is reflective of the return and may depend on the period length. For instance, had we chosen a multi-year time period, the colors would be much milder.

Vertex 610, just like the other vertices in FIG. 6, has a bottom label 740 that identifies the absolute value changes instead of invested capital figures. For example, vertex 610 shows that ETF technology assets have depreciated by $12.21 for the displayed period, while dividend paying, single stocks have appreciated $21.87 in the same period.

FIG. 6 also conveys information about the amount of invested capital at each vertex, but in a relative manner: instead of always drawing a full circumference around each vertex, a circular arc 750 is drawn instead as shown in FIG. 7. The length of the arc is proportional to the weight of the portfolio. In particular, only the topmost vertex has a full circumference drawn around it as it represents all of the assets 310 in the portfolio. In FIG. 6, the arc 750 is not shown in order to simplify the drawings, but the lattice 600 is intended to be shown on an actual user interface 210 with partial circular arcs 750 representative of the invested capital at each vertex.

If the period of time for which the return is shown in FIG. 6 is only two days, the –2.4% whole portfolio return would be considered a relatively large drawdown. If one wanted to find out what caused this, one could conduct a "naive" investigation without using line diagrams, but a table of assets instead. One would sort in ascending order the return of all assets and conduct an investigation of the largest losses to identify assets responsible for the aggregate loss. After this, one would have to look for common attributes among the assets with the largest losses in order to formulate a causal hypothesis. This approach is not optimal, even for a moderately large number of assets. A non-naive and better way of obtaining such information is to look at the lattice 600 depicted in FIG. 6. In particular, such graphical representation transmits rapidly to the user which sets of attributes are associated with heavy losses. This is because of color as well as due to the readily available return (i.e., performance) figures of portfolios.

Pruned Structures

Shortcomings of Using Unpruned Lattices

The lattices 400, 500, and 600 depicted in FIGS. 4, 5, and 6, respectively, each can be shown in their entirety on a standard computer screen. These three lattices 400, 500, 600 contain only seventeen vertices. Lattices with more than fifty vertices, on the other hand, are very likely to overload the display capabilities of a computer screen, and the cognitive capacities of an analyst. The number of vertices in a concept lattice is related to the number of rows and columns of the underlying data. In the example data 300 from FIG. 3, this comprises nine rows of assets 310 and nine columns of binary attributes 320. More important than the number of rows/columns is the so-called VC (Vapnik-Chervonenkis) dimension of the underlying data. There exists one example of nine-by-nine tabular data, for which the associated lattice has 512=29 vertices. Such a lattice is an example of the cognitive overload problem.

Thus, even though showing the full lattice for a quick understanding may be practical in the example shown in FIG. 4, this is not the case for many real-world data sets. The applicant has therefore determined to establish pruning on concept lattices. That means that the graphical user interface created by the computer system will display only the "interesting portion" of lattice structures rather than all of the vertices in the entire lattice network. We will give three examples of pruning techniques, which will be later generalized under a concept called "active core."

Subportfolio Global Rankings

Figure 8:
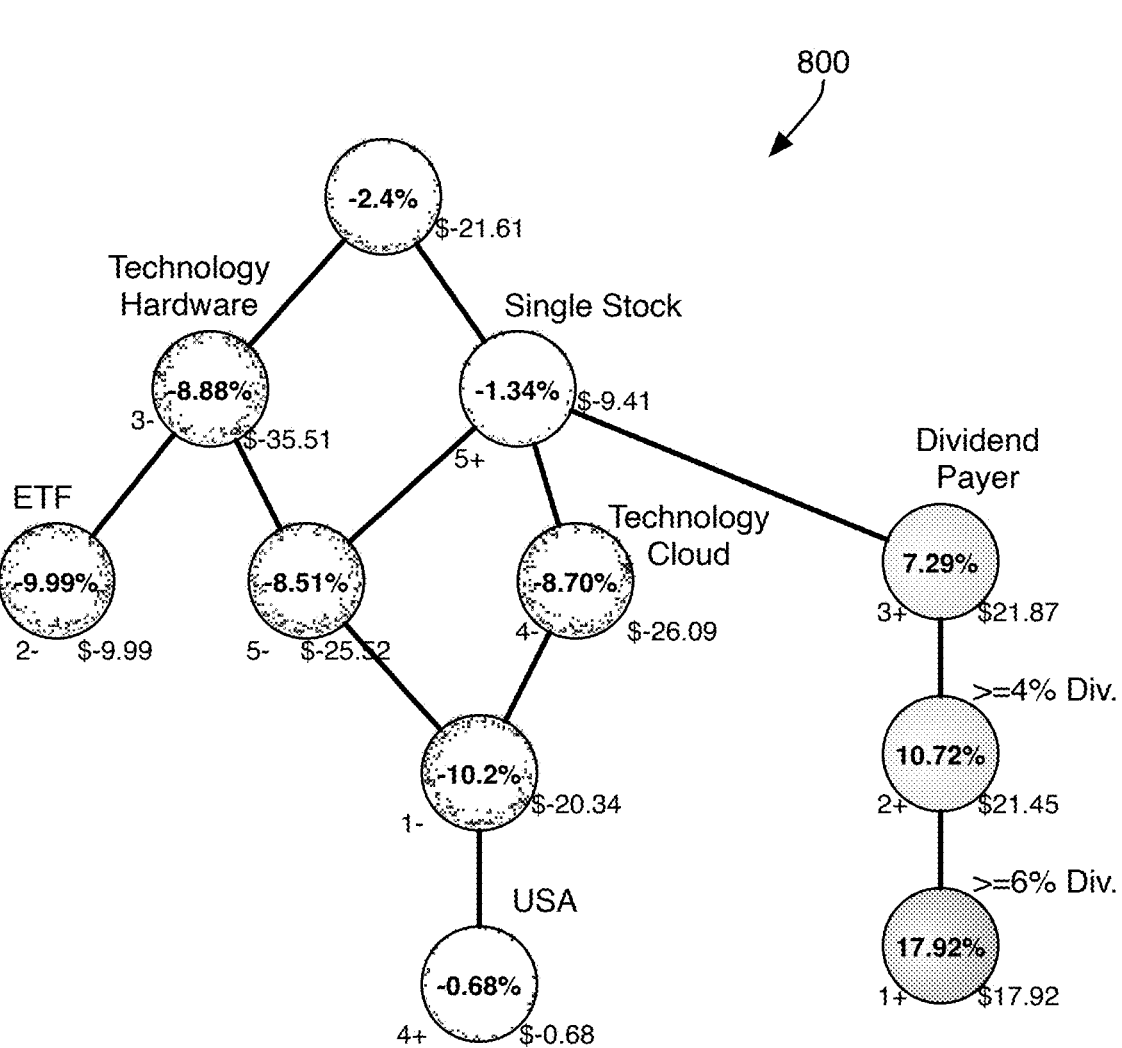
FIG. 8 is a schematic view of an SGR structure for use and display by the user interface device.

A first type of pruned structure is called Subportfolio Global Ranking (SGR). The first example is present in FIG. 8, which shows an SGR structure 800 of the five subportfolios with the best returns as well as the five with the poorest, together with the topmost vertex. To convey this information, SGR structure 800 uses the symbols $1^+$, $2^+$, . . . $5^+$ as well as $1^-$, $2^-$, . . . $5^-$ on left lower labels of vertices. The analyzed quantity in the SGR structure 800 of FIG. 8 is the return (i.e., the relative value change shown within each vertex), which means that the only variable that has an influence on whether a subportfolio ends up in an SGR is its return. The same principle applies if one decides to analyze absolute value changes (shown outside each vertex, to the right). The SGR selection does not consider any interaction with other subportfolios, which contrasts with the approaches described below. The SGR structure 800 shown in FIG. 8 is computable by an algorithm described below.

The SGR structure 800 is an example of a graphical representation of data that is to be presented in interface element 240 of user interface 210. Although it is described as a "structure," the SGR structure 800 is nothing more than a dynamic representation of data that is used to improve the user interface 210 presented on the interface device 200 of a computer system. This is true of other "structures" described in this disclosure. Each structure is useful not as a way of conceiving or even describing data, but as a method of representing data in a dynamic manner through a user interface 210. Each structure is simply the graphical representation of data that is used as interface element 240 in the user interface 210.

Figure 9:
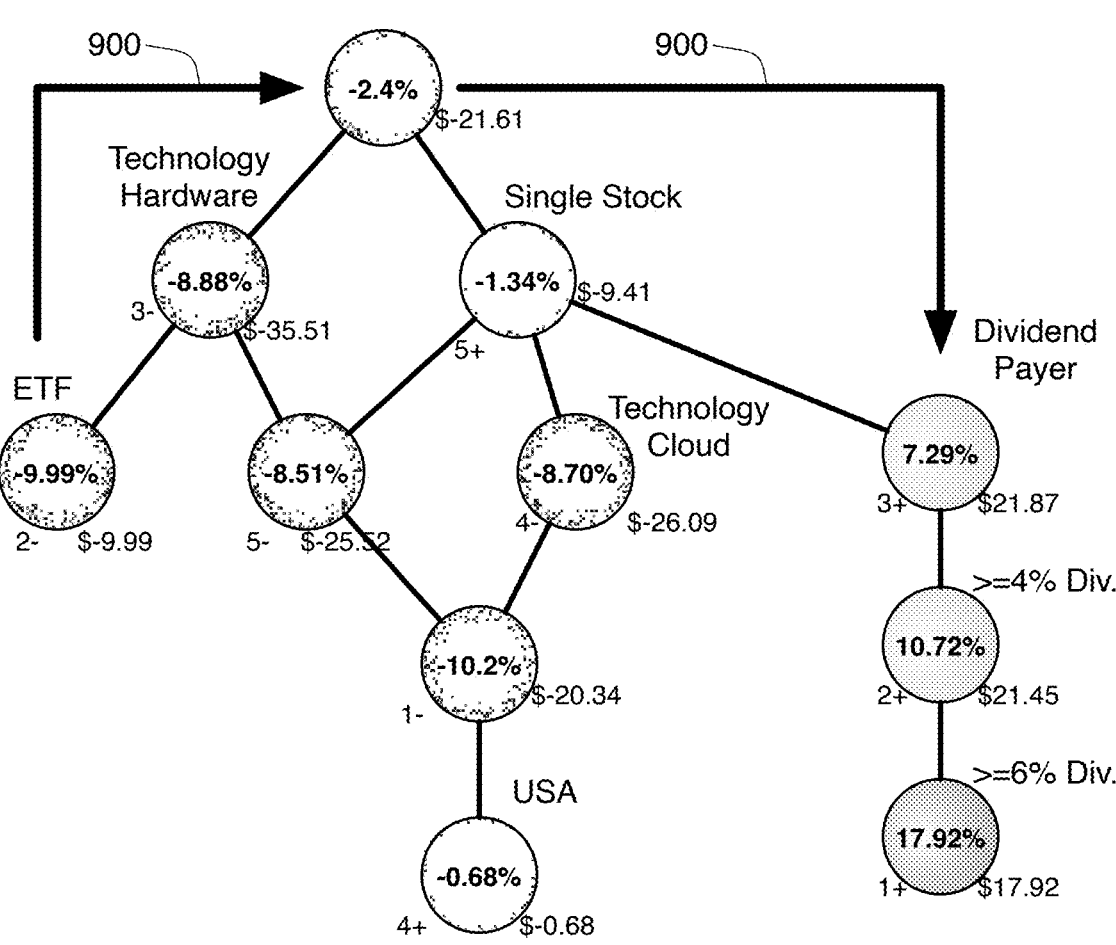
FIG. 9 is another schematic view of the SGR structure of FIG. 8.

The presentation of an SGR structure 800 through the user interface 210 is a useful tool for a decision maker to consider a certain type of investment change. FIG. 9 shows one example of this. It consists of selling a portion of a "losing" portfolio (the vertex labeled with "ETF") and buying into a "winning" one (the vertex labeled with "dividend payer"). A picture such as FIG. 8 or FIG. 9 makes backwards-looking information and relationships explicit. Given this hindsight nature of the information, it is up to the decision maker to decide whether the recent developments are part of a larger trend that is likely to continue, or, if a reversion of the movement is on the horizon, or, as a third possibility, if the movement is over and equilibrium will take hold of the referred asset prices.

The portfolio rotation shown by arrows 900 in FIG. 9 takes place between incomparable portfolios: {"ETF", "technology", "hardware"} and {"single stock", "dividend payer"} are not a subportfolio of one another (actually, their attribute sets are even disjoint). This indicates that the nature of their underlying assets may be quite different. Indeed: one of them contains investment fund vehicles (ETF), whereas the other comprises single stocks. Moreover, the first contains only investments in technology, while the second is made up of stocks that pay dividends (which is a sign of enterprises in mature stage and likely non-tech). Therefore, the rotation depicted in FIG. 9 corresponds to a somewhat drastic change in the investment characteristics of the whole portfolio itself, with an example of such characteristic being risk (as measured by volatility). This is analogous to what is known in the industry as an asset allocation decision. Such decision is often not taken lightly and would likely require approvals of some sort. In contrast, consider the rotation from the portfolio "single stock", technology", "hardware", "cloud" into its American subportfolio (i.e., the one whose value changed −0.68%). This second rotation is akin to what is known in the industry as security selection, as the risk/reward profile of the investments is the same, but one or a few minor, non-financial characteristics are different—in this case, the geography.

To sum up, SGRs are a tool for monitoring extreme portfolio performances in general. This, however, does not provide a focus for security selection. The reason being the global nature of the ranking, as is mentioned above. In the next subsection, we will see a different approach that shows exclusively large deviations between comparable portfolios (i.e., when one is a subportfolio of the other).

Comparable Sub-Portfolio Rankings (CSRs)

Figure 10:
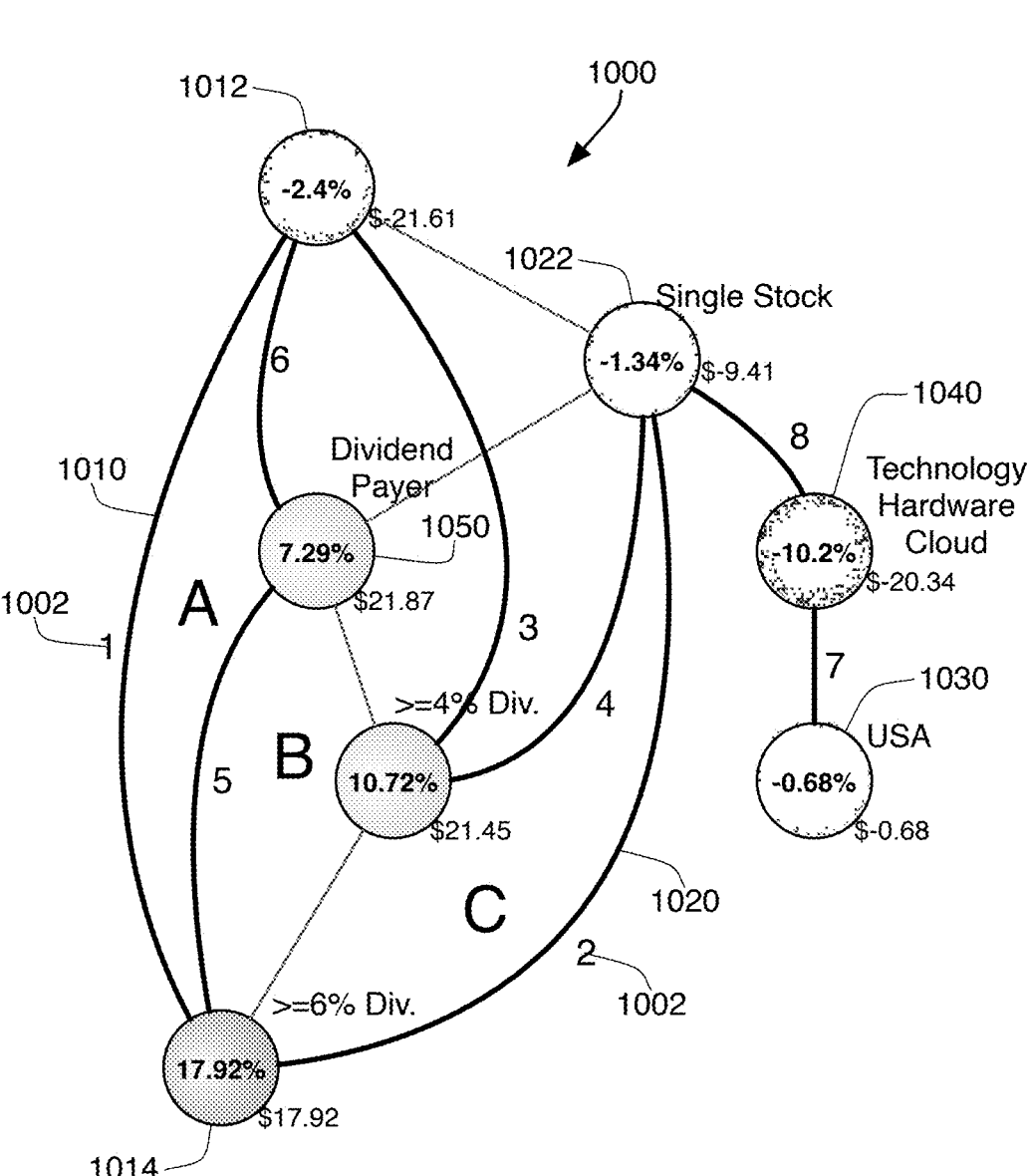
FIG. 10 is a schematic view of a CSR structure for use and display by the user interface device.

Suppose that we are interested in the eight largest return differences, in absolute value terms, among all of the comparable subportfolio pairs of FIG. 6. This information can be represented as a comparable subportfolio ranking (or CSR) structure 1000, as shown in FIG. 10. As was the case with SGR structure 800, the CSR structure 1000 is merely a dynamic graphical representation of data used as interface element 240 within the user interface 210. One embodiment of the SGR structure 800 contains edge labels 1002, ranging from one up to eight, which convey the ranking of the differences amongst all comparable subportfolios. For example, edge 1010 has an edge label 1002 of "1," indicating that edge 1010 between the topmost portfolio 1012 and the >=6% dividend portfolio 1014 is the largest difference found in the data between comparable subportfolio pairs. Similarly, edge 1020 has an edge label 1002 of "2," indicating that edge 1020 reveals the second largest difference between the single stock portfolio 1022 and >=6% dividend portfolio 1014. To ease exposition, we define the value of an edge to be the absolute value of the difference of the values of its endpoints. For instance, if an edge links two vertices having −2% and 4% as their values, then the value of the edge "e" is 6%. The value of edge 1010 is 20.32%, while the value of edge 1020 is 19.26%.

In CSR structure 1000, there are two types of edges shown, namely bold (or thicker) and faint (or thinner). All of the bold edges in FIG. 10 are shown with edge labels 1002, while none of the faint edges have an edge label. Any pair of vertices which is linked by any type of edge is a subportfolio/superportfolio pair. This is equivalent to saying that they are comparable. The bold, labeled edges represent the eight largest differences between all comparable portfolios. If an edge is faint, then this means that its endpoints do not differ enough to figure among the eight largest. The number eight was chosen here to provide an example figure. The actual number can be chosen based on the size of the dataset and number of vertices. The number can also be based on user selection or preference.

The different types of edges convey different information about the relationship between the vertices. The faint edges convey only hierarchy information. The bold edges convey that, not only are the linked pair of vertices comparable, but also that the edge is associated with a high difference value. While the first relation (of faint edges) is transitive, the second one (of bold edges) is not. The hierarchy being transitive means that, when B is a subportfolio of A and C is a subportfolio of B, we do not need to draw an edge from C to A because it is inevitable that C be a subportfolio of A. This fact is implicit, and graphical user interfaces (GUIs) in general do not draw an edge AC in order to minimize visual impact. This can be seen in CSR structure 1000, where the vertex 1030 (labeled with "USA") has a bold edge towards vertex 1040 (labeled with "technology, hardware, cloud"), which in turn has a bold edge to vertex 1022 ("single stock"), but "USA" vertex 1030 and "single stock" vertex 1022 are not connected with a bold edge. This is because the difference value between these vertices 1030, 1022 is not among the eight largest. Thus, the relation of bold edges is not transitive.

The non-transitivity of bold edges implies the following. A GUI that explicitly displays all the high differences between comparable vertices must display all the bold edges; even if they form a triangle such as the one between the >=6% dividend vertex 1014, the dividend payer vertex 1050, and the topmost vertex 1012. The edge between >=6% dividend vertex 1014 and the topmost vertex 1012 is what we call the "transitive edge" of the triangle, since the intermediary vertex of the triangle is not incident to it (in a sense, the transitive edge of a triangle is the "longest" or its "hypotenuse"). Note that the definition of transitive edge is independent of triangles: in general, an edge from vertex A to B is said to be transitive if there exists a path from A to B that does not contain said edge. Furthermore, observe that the removal of a transitive edge does not disrupt the attributes associated with any vertex, since the "reachability" between all vertex pairs is preserved.

There is a trade-off between a user interface 210 which is explicit and one which shows structures that are more compact (with less edges, for example). In one embodiment, a user may choose between displaying all transitive edges, none at all, or something in between. Such a choice may be made through user preferences, through the menus 220, the side bar 230, or through other user interface elements. More formally, this is a user-driven preference referred to as the Transitive Edge Removal Policy (TERP). At any point in time, the user may still opt-in to see the removed transitive edges, for example if a certain user-driven event took place, such as a mouse hovering, double click, et cetera. The reaction of the user interface 210 can be global (with respect to the whole CSR structure 1000) or just over a selected portion of it.

Since the relation of faint edges is transitive, the possibility of faint, transitive edges may be excluded from interfaces such as the one shown in FIG. 10. In other words, such edge would not convey new information to the user. Note that this implies that no completely faint triangles would ever be presented in an interface such as is shown in FIG. 10. Therefore, there exist exactly three types of possible triangles: the ones with three, two, or one bold edge(s). In FIG. 10, we show one triangle of each one of these types. More particularly, triangle A is shown in FIG. 10 as a large letter A positioned within three bold edges that form triangle A (between vertices 1012, 1014, and 1050). Triangle B is shown in a location with one bold edge and two faint edges, while triangle C is shown in a location with two bold edges and one faint edge.

Figure 11:
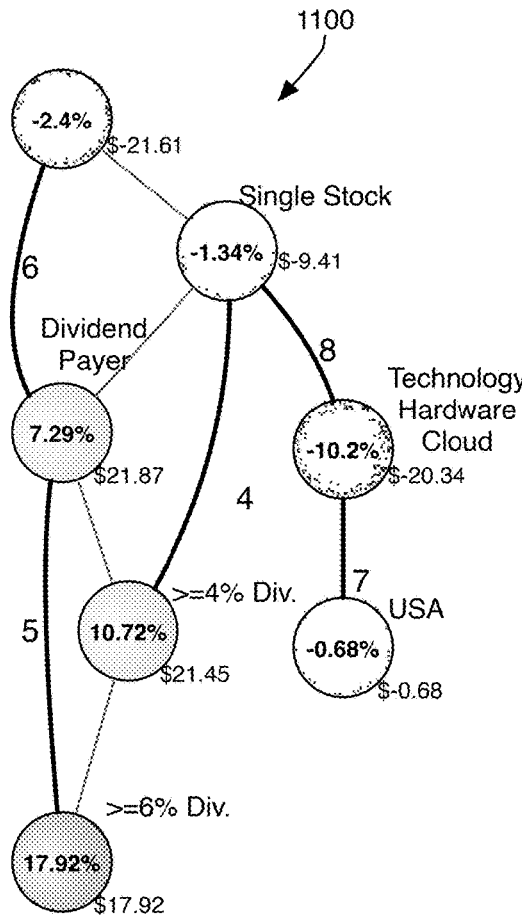
FIG. 11 is a schematic view of another CSR structure.
Figure 12:
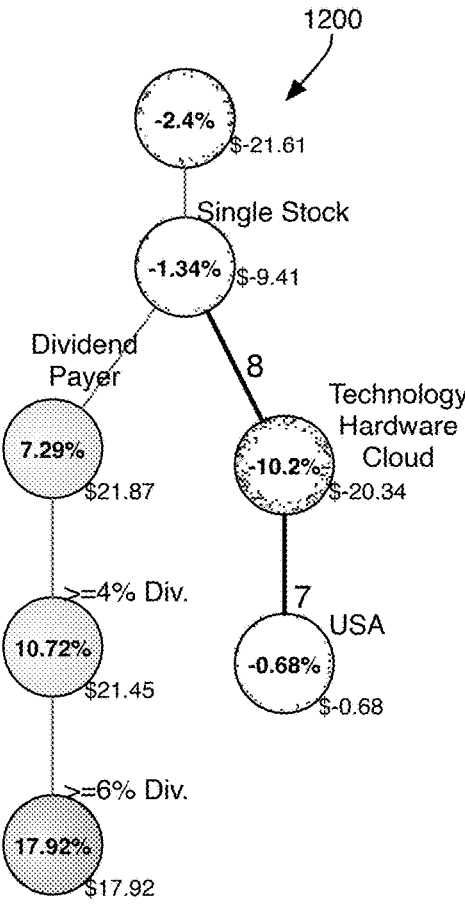
FIG. 12 is a schematic view of yet another CSR structure.

The impact of the TERP on the presentation of the CSR structure 1000 can be seen in FIGS. 11 and 12. These figures show two different CSRs structures, namely CSR structure 1100 in FIG. 11 and CSR structure 1200 in FIG. 12. These different CSR structures 1100, 1200 are being presented as interface element 240 using two different TERPs. In FIG. 11, CSR structure 1100 utilizes a transitive edge removal policy that gets rid of transitive edges of triangles that have at least two bold edges. In FIG. 12, CSR structure 1200 utilizes a TERP that removes all transitive edges, thereby removing all triangles. It is up to the user to scan the displayed CSR structure 1200 to perceive where the large differences are.

Figure 13:
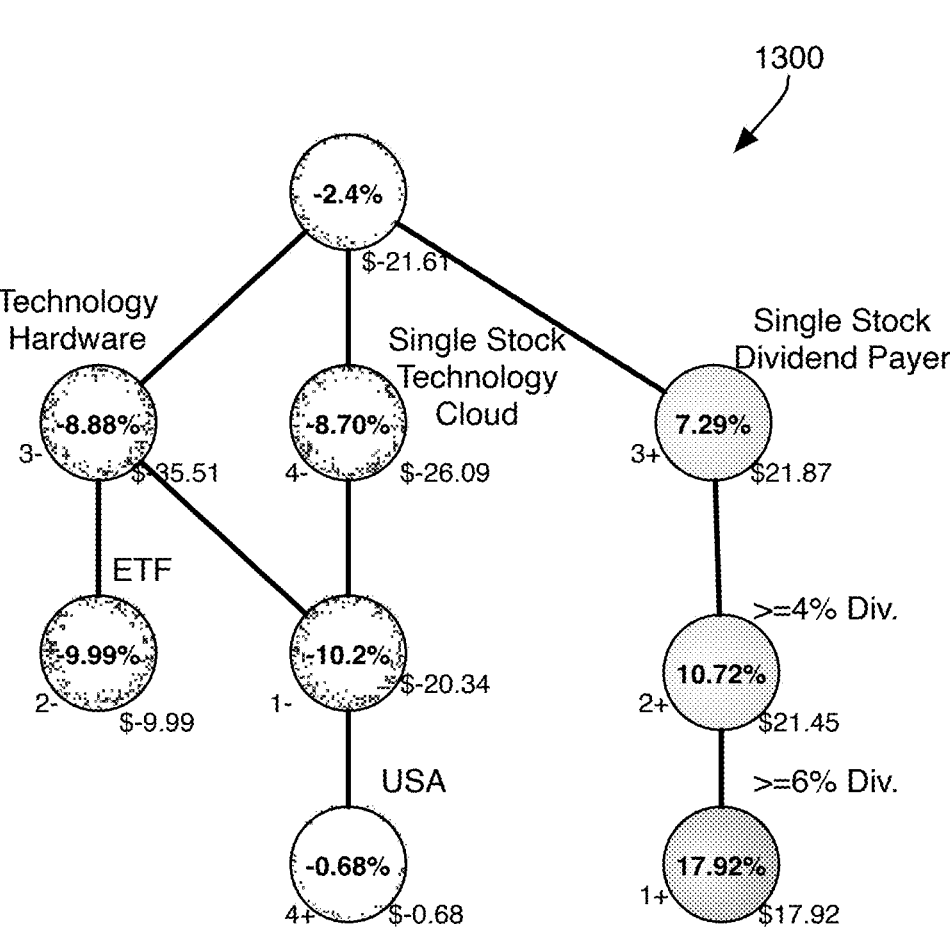
FIG. 13 is a schematic view of an SGR structure for use and display by the user interface device.

In several ways, CSR structures 1000, 1100, and 1200 are superior to SGR structure 800 for analyzing time-based data in a portfolio. This can be seen by viewing another Subportfolio Global Rankings structure, such as SGR structure 1300 shown in FIG. 13. SGR structure 1300 identifies the eight portfolios with the most extreme returns, in contrast with SGR structure 800 of FIG. 8, which shows ten portfolios with the most extreme returns. When comparing SGR structure 1300 against one of the CSR structures, such as CSR structure 1000, SGR structure 1300 fails to show the second largest edge 1020, namely the edge linking the single stock vertex 1022 with the >=6% dividend vertex 1014. Indeed, the {"single stock"} vertex 1022, which is incident to said edge 1020, is not even present in FIG. 13.

Distinct-Source Comparable Rankings (DCR)

Figure 14:
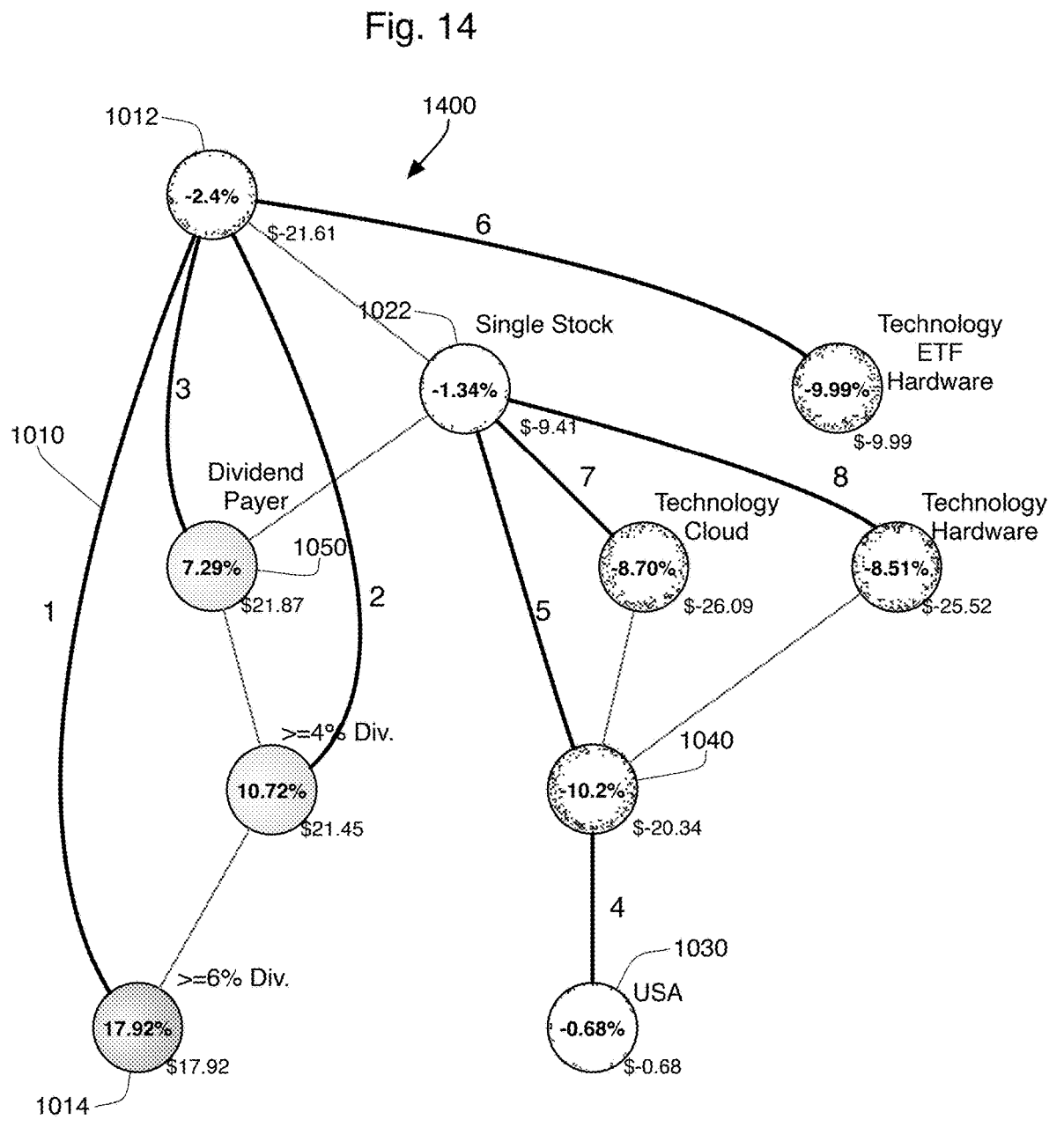

Consider the CSR structure 1000 depicted in FIG. 10. The >=6% dividend portfolio 1014 has three upward bold edges incident to it. Given that the number of (the largest) differences being displayed in the user interface 210 using this CSR structure 1000 is eight, there is a considerable amount of focus towards this one portfolio 1014. In other words, ⅜ or 37.5% of all the bold edges are highlighting this one portfolio 1014. This tendency of attracting many bold edges happens particularly for portfolios that have both extraordinary performance and many attributes. In this case, the assets 310 that comprise the >=6% dividend portfolio 1014 have four attributes, as can be seen in FIG. 3 (for British American Tobacco). For datasets with many more attributes, one would possibly have an excessive focus on such portfolios, in a way that is detrimental to a more global view. Therefore, it often makes sense to search for the largest comparable portfolio differences, but in such a way that, for each portfolio A, only the upwards reachable portfolio B with the maximum difference is considered. The structure obtained this way is called "Distinct-source Comparable Ranking" (DCR), and an example DCR structure 1400 is present in FIG. 14.

In DCR structure 1400, every vertex has at most one bold upwards edge. This favors the appearance of more vertices. Indeed, said figure comprises 10 portfolios, whereas the CSR of FIG. 10 only has 7. The DCR structure 1400 does not focus excessively on the >=6% dividend portfolio 1014. The DCR structure 1400 also decomposes nicely a few subportfolios of the {"single stock"} losing portfolio 1022, in a way that is more detailed than the CSR structure 1000 of FIG. 10. Of course, there is a tradeoff between using a DCR structure 1400 instead of a CSR like CSR structure 1000: since the DCR structure 1400 considers a subset of all comparable portfolio pairs, it will show differences that are not as large as the corresponding CSR structure 1000.

Active Cores

Figure 15:
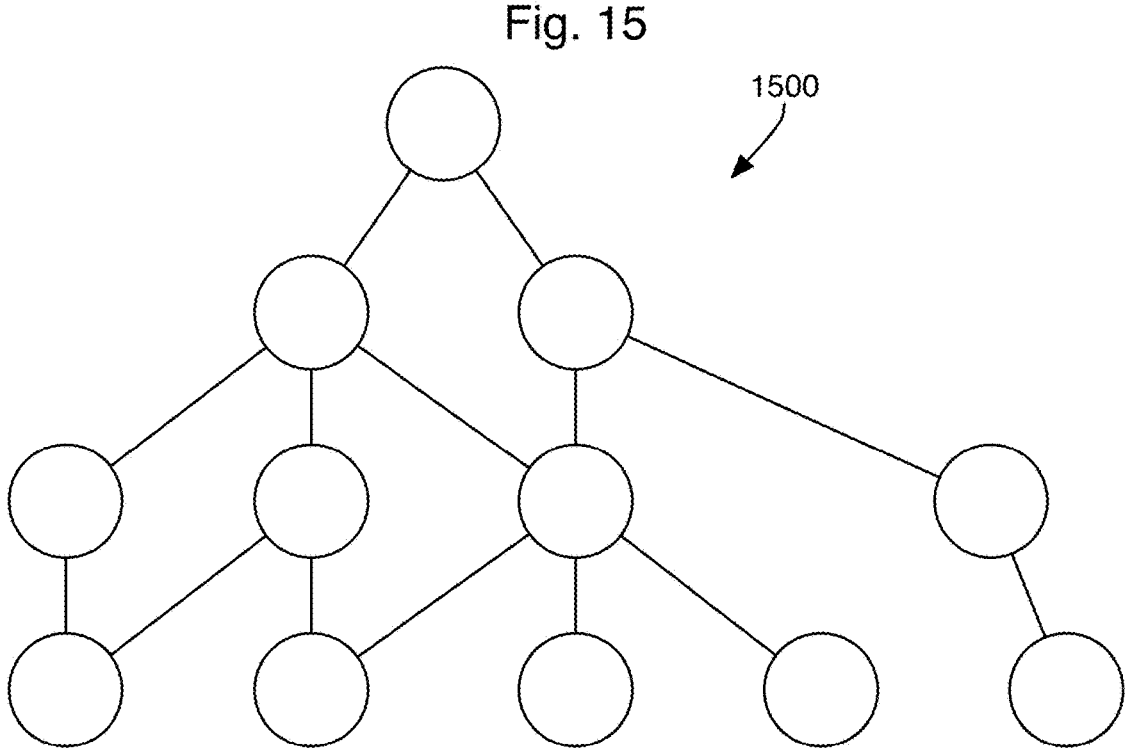
FIG. 15 is a schematic view of a directed graph.
Figure 16:
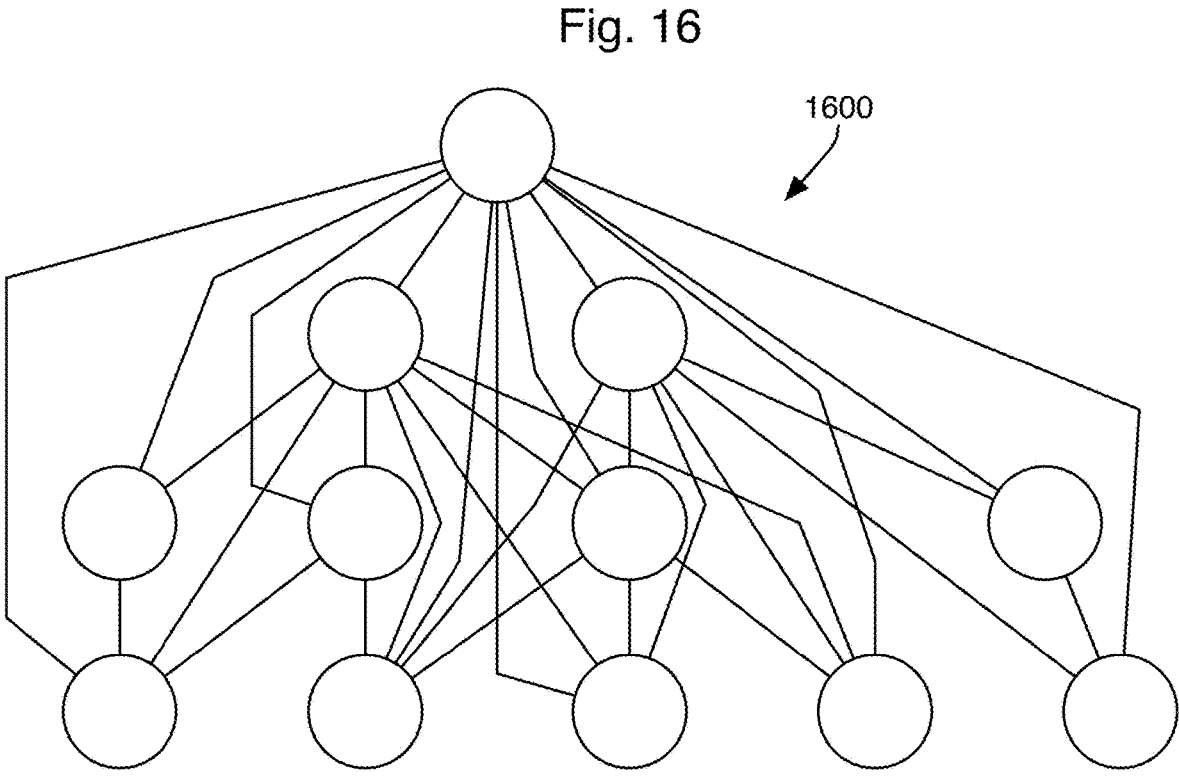
FIG. 16 is a schematic view of a transitive closure structure.

The SGR structure (such as SGR structures 800, 1300); the CSR structure (such as CSR structures 1000, 1100, and 1200); and DCR structure (such as DCR structure 1400) all fit under a unifying framework called active core. The transitive closure of a structure such as the ones that we have been exploring can be described as follows. Take any structure (mathematically: a directed graph) such as the directed graph 1500 in FIG. 15. In this directed graph 1500, as was the case in the structures described above, the direction of edges is implicit in the Y-coordinate of the vertices. Whenever there is a path (of whatever length) from one vertex A to a second vertex B, we link A and B directly. The resulting transitive closure structure 1600 is displayed in FIG. 16.

As we will see, computing the transitive closure will be an intermediate step when determining an active core. The main reason for this is that the operation adds a quite large number of edges, and leaving so many additional edges in the diagram would overload the cognitive capacities of the user interface 210 if transitive closure structure 1600 is used as interface element 240. Moreover, many of the added edges will not be necessary since they could be deducted by transitivity in many cases (as per the discussion above).

The active core of a structure is that portion of the structure that is to be displayed to a user after an analysis of the structure's vertices and edges. The active core depends on three parameters: one edge filter, one edge score evaluation, and one transitive edge removal policy. An edge filter takes care of limiting the scope of evaluated edges. The purpose of an edge score evaluation (ESE for short) is to judge whether an edge is "outstanding enough" in order for its endpoints to be displayed on the user interface 210. All three parameters are a "true" or "false" check, i.e., they are predicates. After analyzing these parameters, those vertices and edges that do not form part of the active core are considered an unselected subset of vertices and edges and are pruned away before the display of the active core.

Method for Defining an Active Core

An active core is, in one embodiment, the result of the execution of the following algorithm:

Let S be a structure, F an edge filter, ESE an edge score evaluation and TERP a transitive edge removal policy.
1) Compute T := transitive_closure(S)
2) Set T' as the subset of the edges of T for which F is "true"
3) For each edge "e" of T', check its edge score evaluation ESE(e, T'). If "true", mark "e" with "bold" and both endpoints of "e" with "stay". If "false", mark "e" with "faint".
4) Other than the topmost, prune away any vertex which was not marked with "stay". (The edges incident to the pruned vertex are obviously also pruned.)
5) Remove every faint transitive edge.
6) Submit each remaining transitive edge to the given TERP and act accordingly: remove it or keep it.

Figure 17:
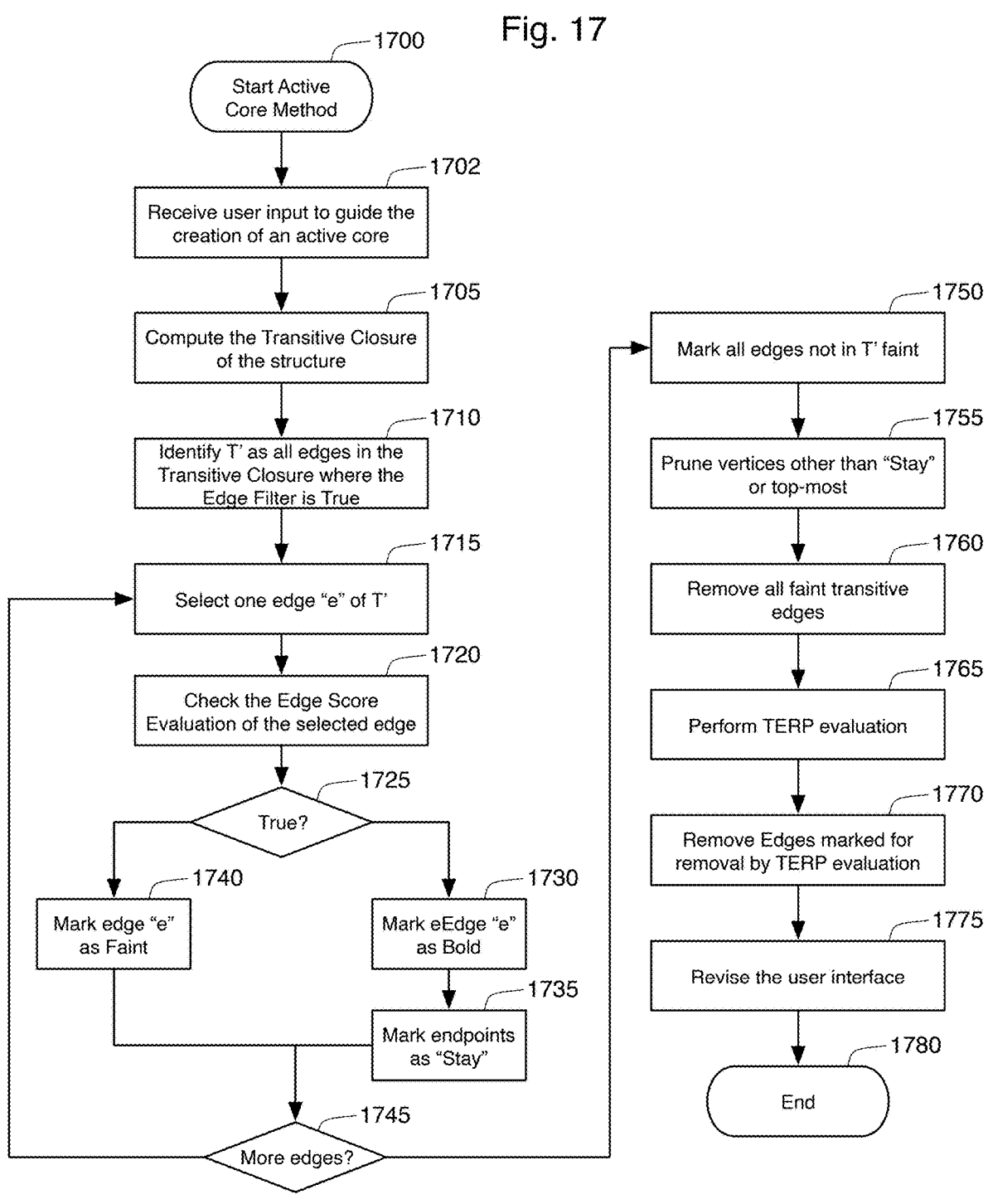
FIG. 17 is a flow chart of a method for defining an active core.

This algorithm is also set forth in the computer-implemented method 1700 shown in the flow chart of FIG. 17. This method 1700 can be performed at the remote computer system 110 to create the user interface 210 at the remote interface device 112. Alternatively, the method 1700 can be performed at the server 130 for presentation at the remote interface device 112 or at a local interface device 132.

Figure 38:
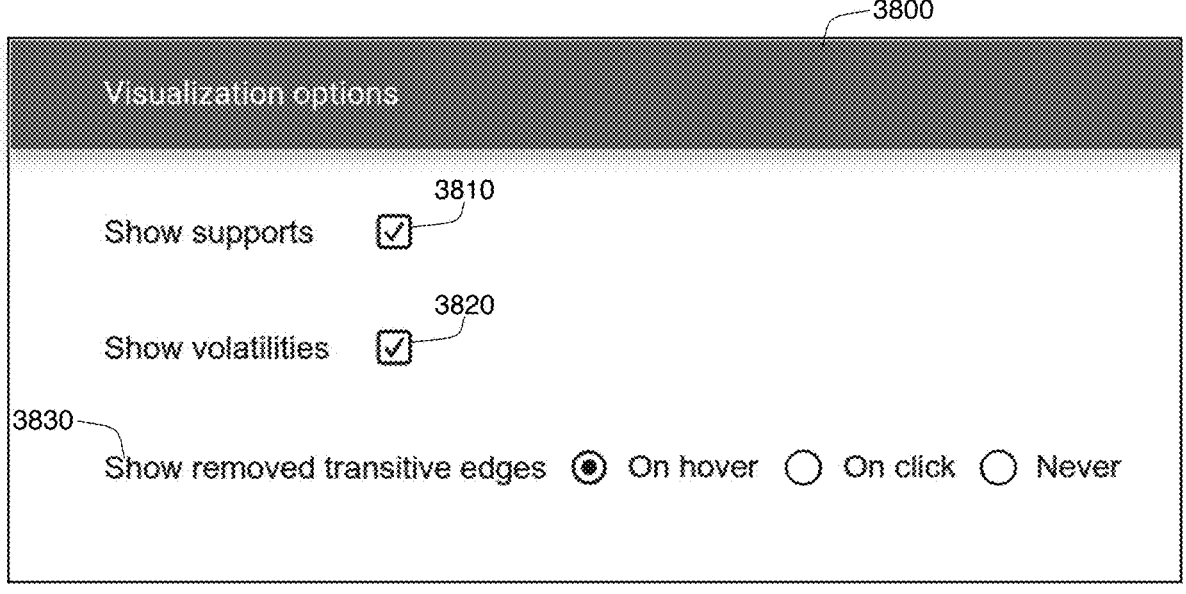
FIG. 38 is a schematic view of a user interface element.

The first step 1702 of method 1700 is to receive user input through the user interface 210 to guide the creation of the active core. The user interface elements that can be used for receiving this input can include one or more menus 220 or side bar 230 as described above, or those elements described below in connection with FIGS. 37 and 38. In some embodiments, all or a portion of the current structure is displayed to the user prior to receiving this input. The current structure could be any directed graph, such as directed graph 1500, or could take the form of a formal concept lattice described above. The portion displayed before user input may, in some cases, be a portion previously defined through a previous application of method 1700.

The next step 1705 is to compute a transitive closure of the current structure using the method described above in connection with FIG. 16. At step 1710, all edges in the transitive closure are examined according to the edge filter, and a subset of edges (known as T') is identified containing only those edges where the edge filter is true. At step 1715, one edge "e" is selected from T'. At step 1720, the edge score evaluation (ESE) is performed on edge "e." Step 1725 determines whether the ESE returns "true" for this edge, which means that the edge meets the requirements of the ESE. If so, step 1730 marks that edge as bold, and step 1735 marks both endpoints for that edge as "stay." Of course, there is no need to literal use the phrase "stay" in this step. All that is necessary is to indicate that these vertices should not be pruned away in future steps. Furthermore, rather than actually bolding the edge, step 1730 could simply mark the edge as meeting the requirements of the ESE. If step 1725 determines that the edge score evaluation returned "false," then step 1740 marks the edge "e" as faint. Either way, step 1745 determines if more edges need to be evaluated in T'. If so, the method returns to step 1715 to select the next edge.

Once all edges are evaluated, step 1750 will mark all edges in the transitive closure structure (such as graph 1600) computed at step 1705 that are not part of the T' set of edges as faint. Next, step 1755 prunes away all vertices that are not marked "stay" and are not the topmost vertex. Step 1760 next removes every faint transitive edge. Observe that step 1760 does not remove every faint edge, but only faint transitive edges. This ensures that only Step 1765 then performs a TERP evaluation on all edges. All edges marked as true (or for removal) by the TERP evaluation are then removed from the structure at step 1770. Step 1775 then revises the user interface 210 in order to display the just-created active core. This allows the user interface 210 to align with the inputs made by the user at step 1702. The process ends at step 1780.

As explained above, there are three parameters that determine the active core of a structure. The first of these, namely the edge filter, is evaluated at step 1710. The second is the edge score evaluation (or ESE), which is evaluated at step 1720. The third is the transitive edge removal policy (or TERP), evaluated at step 1765. Changes made to the way these three parameters are calculated will change the elements of the structure that are provided as interface element 240 of the user interface 210. In fact, an SGR structure 800, 1300; a CSR structure 1000, 1100, 1200; or a DCR structure 1400 are all created through the same method 1700 for determining an active core by simply using different parameters.

This is best seen by way of examples. For the generation of an SGR (such as SGR 800, 1300), these three parameters are set as follows:

1) Edge Filter (F): is true if and only if the edge "e" has the topmost vertex as one of its endpoints.
2) Edge Score Evaluation (ESE): is true if and only if the value difference of the endpoints of the edge is among the k largest or k smallest, where this ranking compares only against other edges in T' subset of edges.
3) Transitive Edge Removal Policy (TERP): Is true for every edge.

Figure 18:
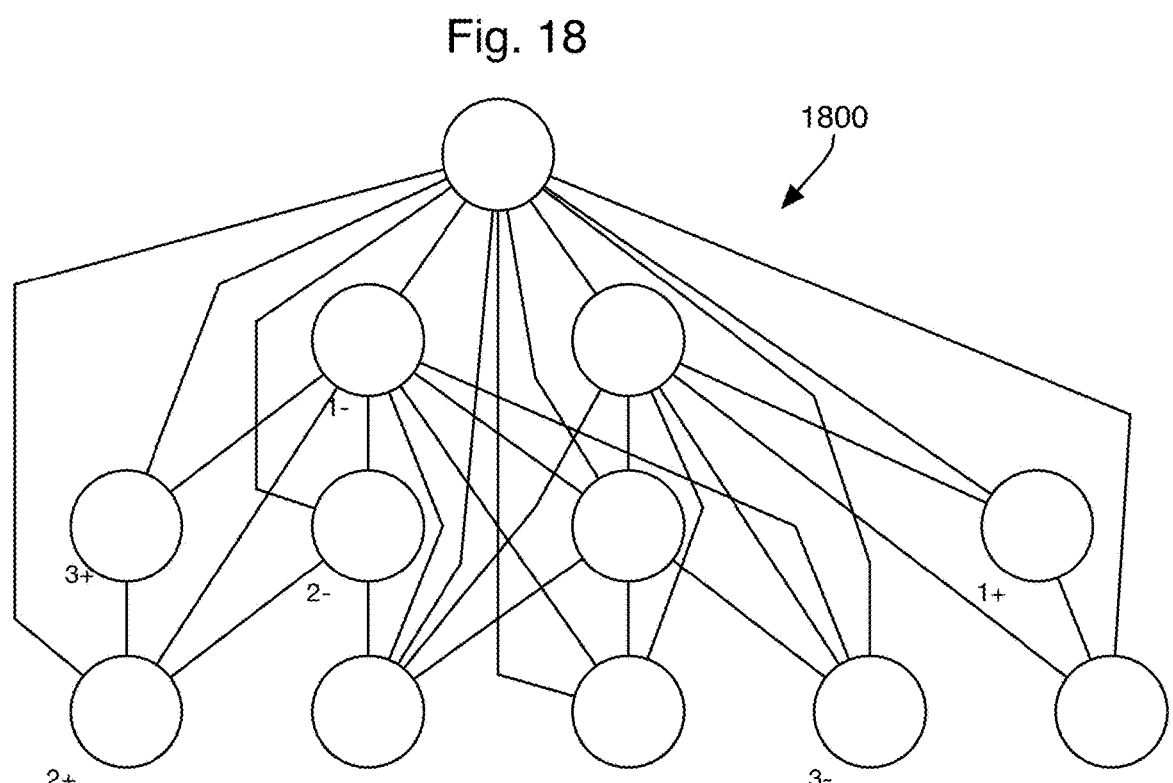
FIG. 18 is a schematic view of another transitive closure structure.
Figure 19:
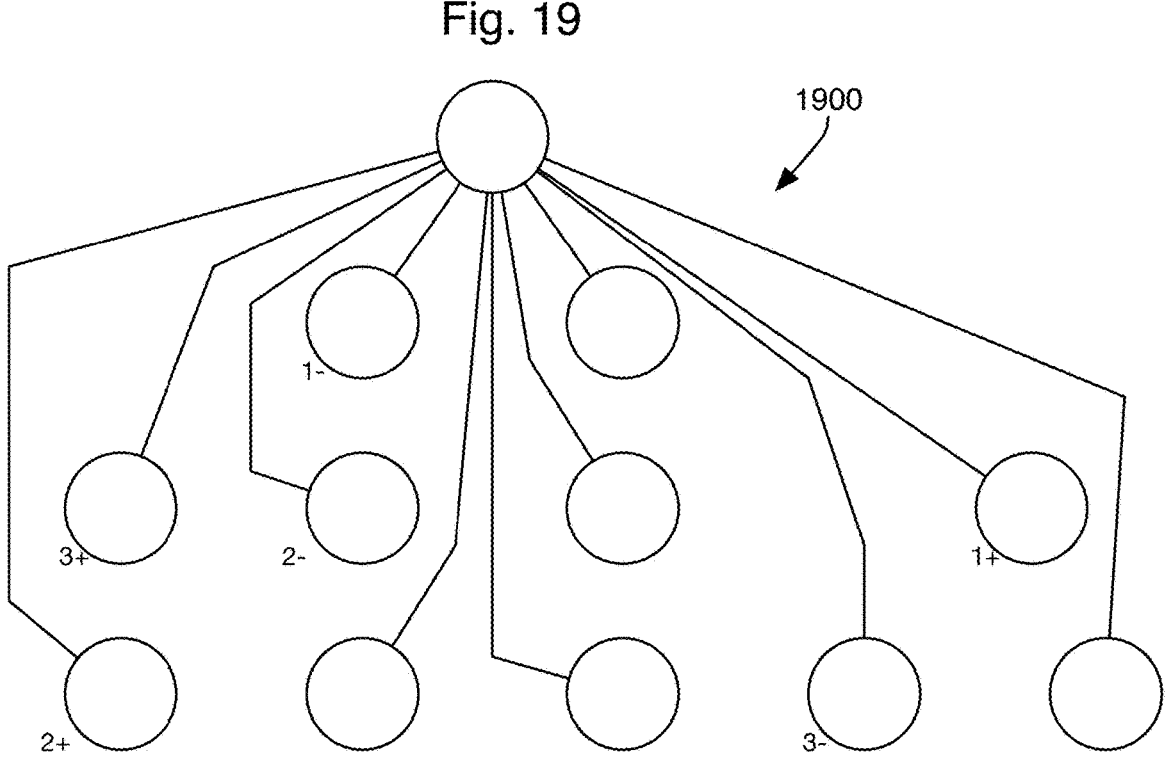
FIG. 19 is a schematic view of the structure of FIG. 18 showing a subset of edges.

The impact of these SGR parameter choices on method 1700 is best seen through FIGS. 18-22. If we start with the arrangement of edges and vertices shown in FIG. 15, then FIG. 18 shows its transitive closure 1800, which is achieved at step 1705 of method 1700. Six of the vertices in the transitive closure 1800 are marked as being either among the largest or smaller endpoints, with 1+ being the largest, 2+ being the second largest, 3+ being the third largest, 1− being the smallest, 2− being the second smallest, and 3− being the third smallest. At step 1710, the edge filter is applied to identify the T' subset of edges. The edge filter for an SGR shown above indicates that the filter is true for an edge in the transitive closure 1800 "if and only if the edge has the topmost vertex as one of its endpoints." The T' subset of edges 1900 can be seen in FIG. 19. Since every vertex in the transitive closure 1800 is adjacent to the topmost vertex, each vertex of the structure will be included as one of the endpoints in the T' subset of edges 1900.

Figure 20:
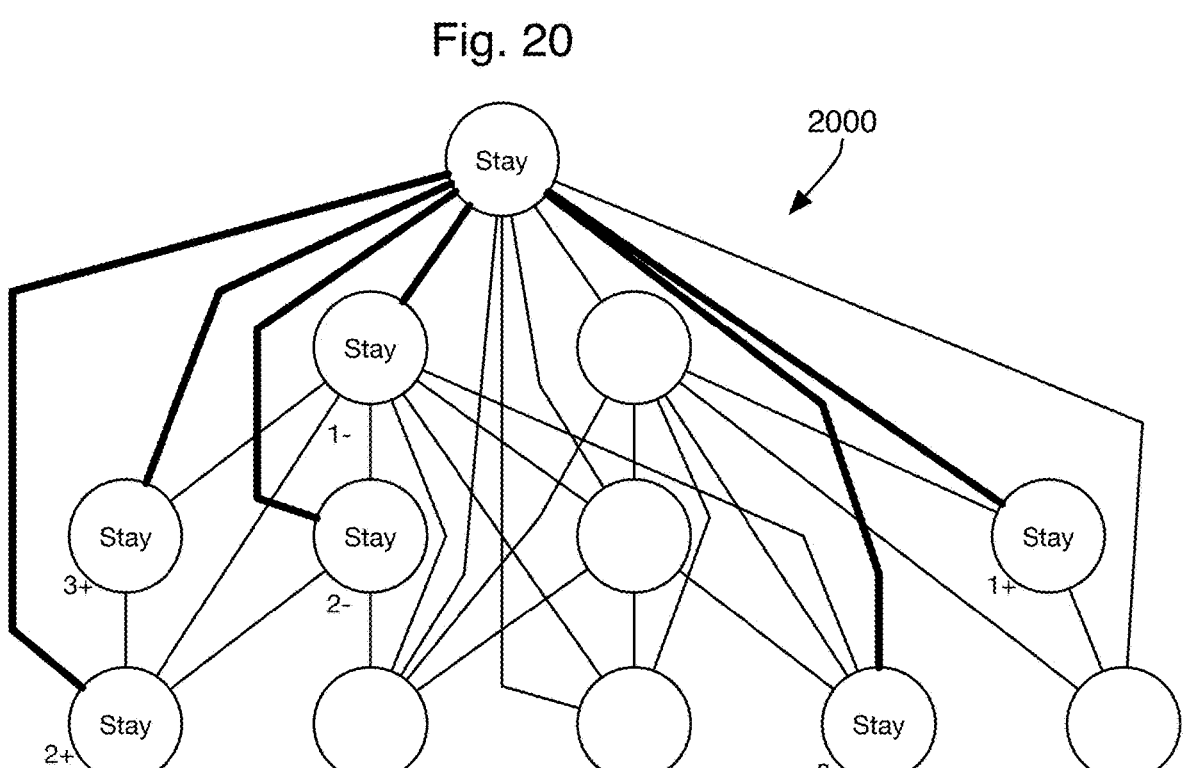
FIG. 20 is a schematic view of the structure of FIG. 18 showing bolded edges.

Steps 1715 through 1735 then determine an edge score evaluation (ESE) for each of the edges in the T' subset of edges 1900. Since every vertex is included in the T' subset of edges 1900, each vertex of the structure will be part of the edge score evaluation. The edge score evaluation of an edge is applied at step 1720. For an SGR, the ESE is true "if and only if the value difference of the endpoints of e is among the k largest or k smallest." Assuming that k=3, then only the edges in the T' subset of edges 1900 that connect to a vertex that contains a label (from 1+ to 3−) will be true. For edges where the ESE is determined to be true at step 1725, step 1730 will mark those edges as bold, and step 1735 will mark the endpoints of that edge as "Stay." If the ESE for an edge is not true, step 1740 will mark that edge as faint. Step 1750 then identifies all other edges in the transitive closure 1800 (that are not part of T') as faint or unmarked. The result is structure 2000, as shown in FIG. 20.

Figure 21:
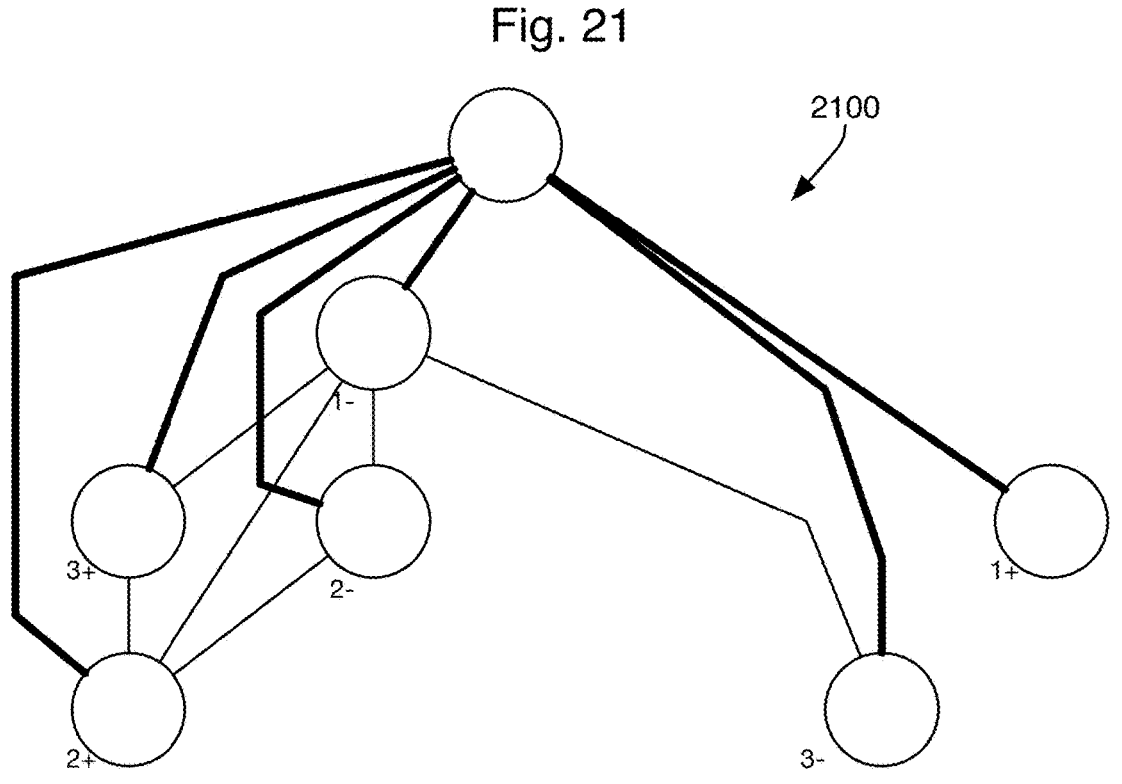
FIG. 21 is a schematic view of the structure of FIG. 20 after pruning.
Figure 22:
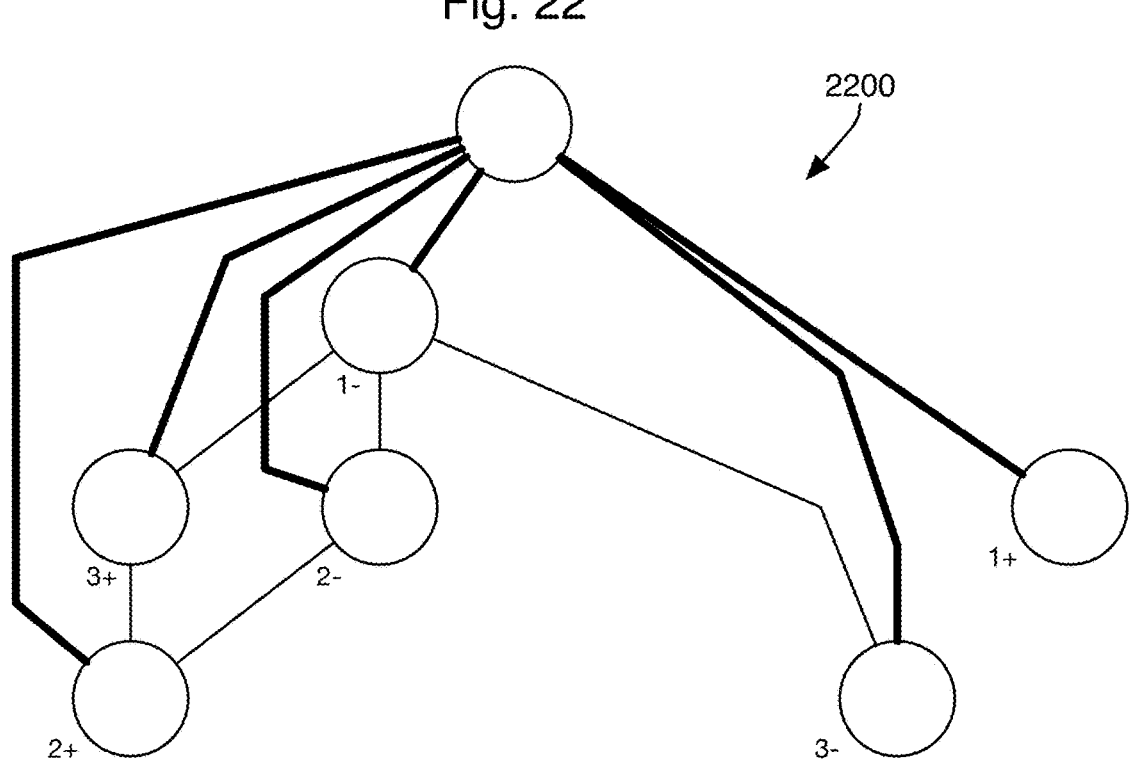
FIG. 22 is a schematic view of the structure of FIG. 21 and removing unbolded transitive edges.
Figure 23:
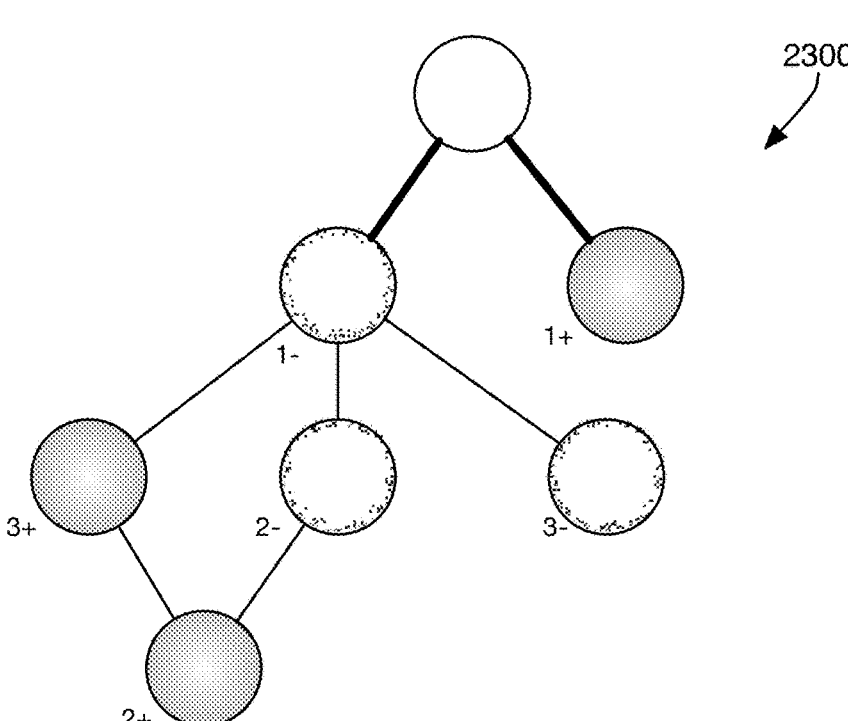
FIG. 23 is a schematic view of a final SGR structure.

Step 1755 will then prune all vertices other than those marked as Stay or that are the top-most vertex. When a vertex is pruned, all edges to that vertex are also removed. This results in structure 2100 as shown in FIG. 21. Next, step 1760 removes all faint transitive edges. Transitive edges are those edges, the removal of which does not impact the reachability of its endpoints. The only faint transitive edge to be removed is that linking the vertex labeled "1−" to the vertex labeled "2+." This is removed in structure 2200 in FIG. 22. Next, at step 1765, the TERP evaluation is performed on every remaining transitive edge. As indicated above, the TERP analysis returns "true" for every edge. This will remove all of the remaining transitive edges in step 1770, which results in a final SGR structure 2300, as shown in FIG. 23. Labels could then be applied to this final SGR structure 2300 according to the attributes for each remaining vertex. Of course, the labels would reflect the descriptions of labels applied above, where each vertex is associated with the labels of every vertex that appears above it in the interface. Color fills could also be applied. For example, vertices associated with a negative values can be filled in red, and vertices with a positive values in green, with the intensity of the color reflecting the relative size of these values.

For the generation of a CSR (such as CSR 1000, 1100, 1200), the three parameters are set as follows:

1) Edge Filter (F): is true for every edge.
2) Edge Score Evaluation (ESE): is true if and only if the value of e is among the k largest values of edges in T'. In this case, the value of an edge is the absolute value of the difference between its endpoint values.
3) Transitive Edge Removal Policy (TERP): The TERP choice is free.

Figure 24:
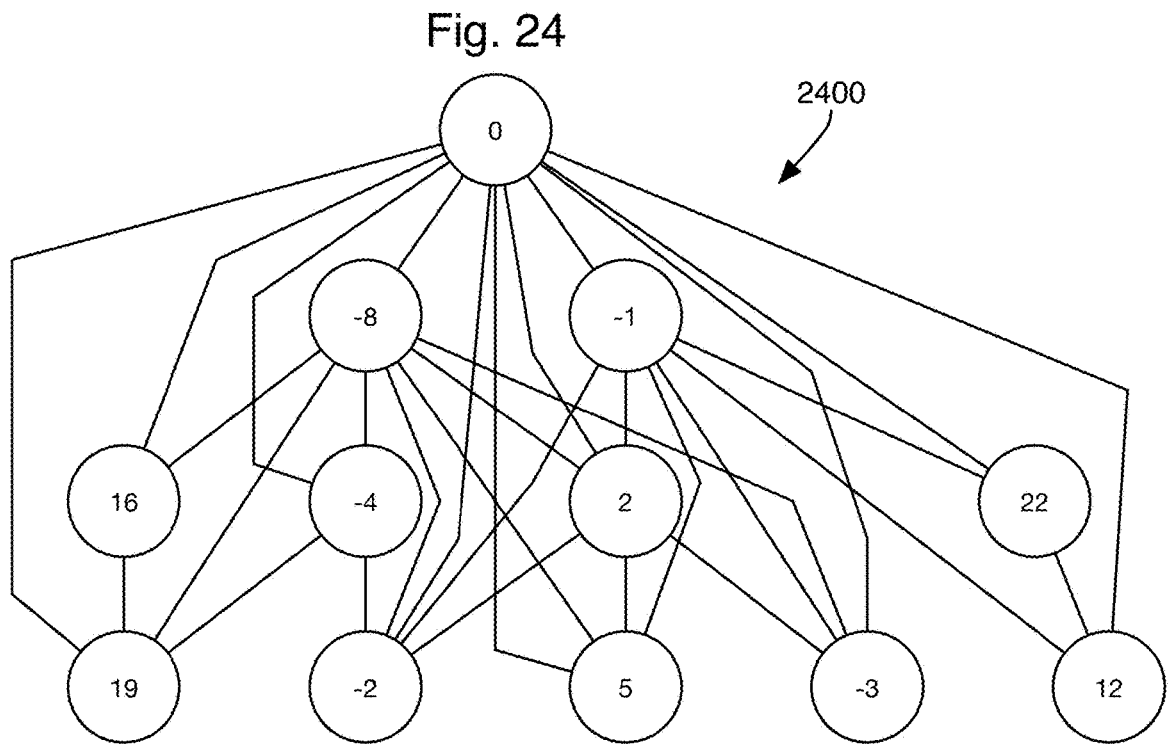
FIG. 24 is a schematic view of a transitive closure with vertex values.
Figure 25:
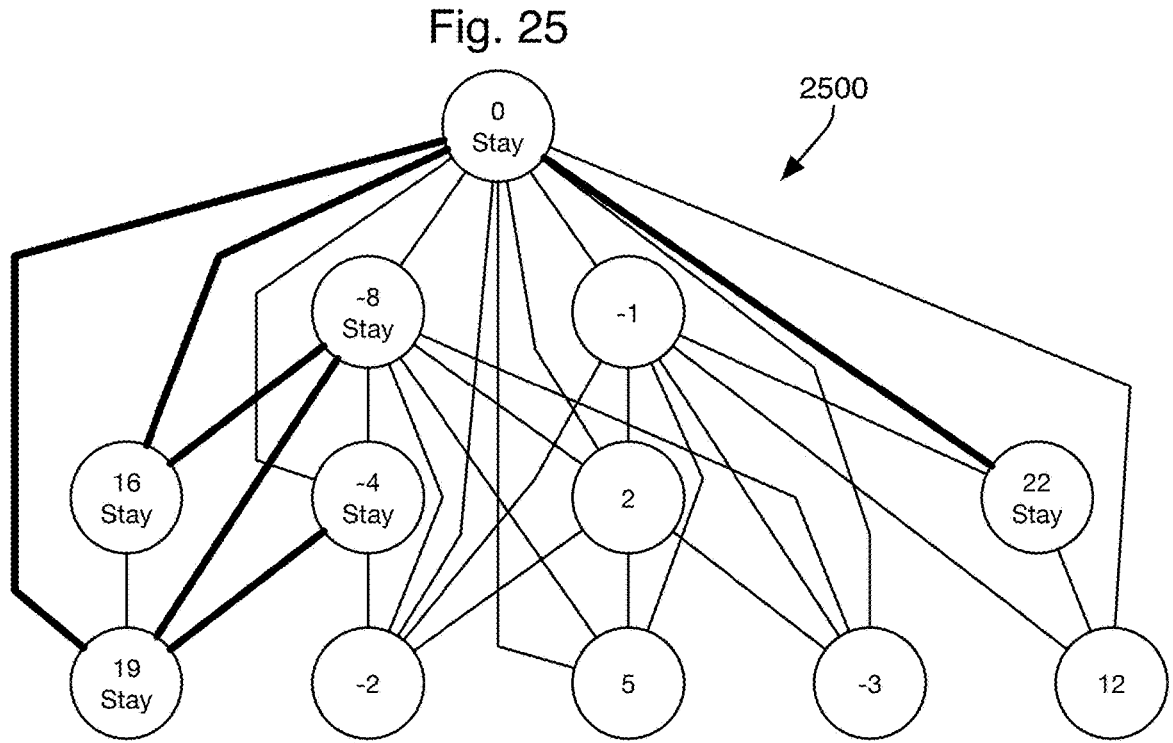
FIG. 25 is a schematic view of the structure of FIG. 24 showing bolded edges.

In this case, the T' set of edges identified in step 1710 will be all of the edges of the transitive closure. Assuming the same transitive closure structure 1600 as the starting point, the T' set of edges is the transitive closure 1800 of FIG. 8. However, for the purposes of this example, underlying values of the vertices will be assigned as shown in the T' set of edges 2400 shown in FIG. 24. Steps 1715-1745 will then analyze the ESE for all edges. These steps will apply the ESE, which determines the difference between endpoint values, and then ranks the edges based on the largest absolute difference value. The edges with the largest k values are bolded and the endpoints are marked as Stay, while other edges are made faint. If k=6, the edges with the largest six absolute values will be bolded, as shown in structure 2500 in FIG. 25.

Figure 26:
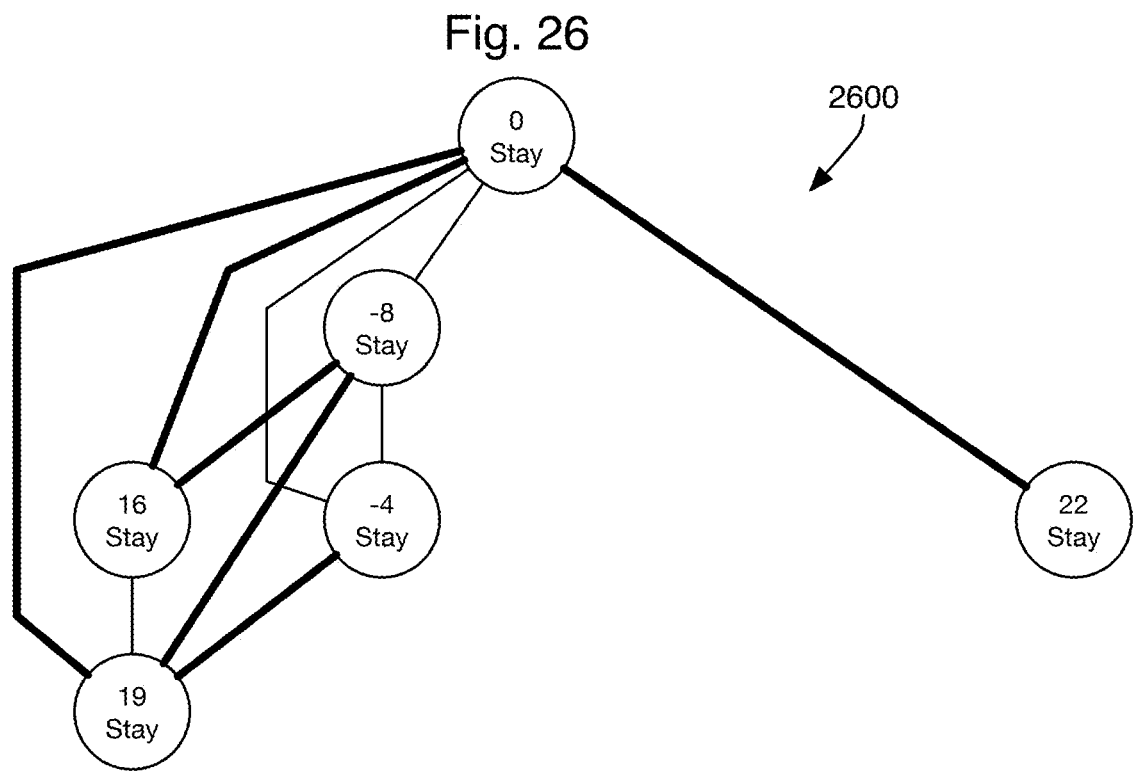
FIG. 26 is a schematic view of the structure of FIG. 25 after pruning.
Figure 27:
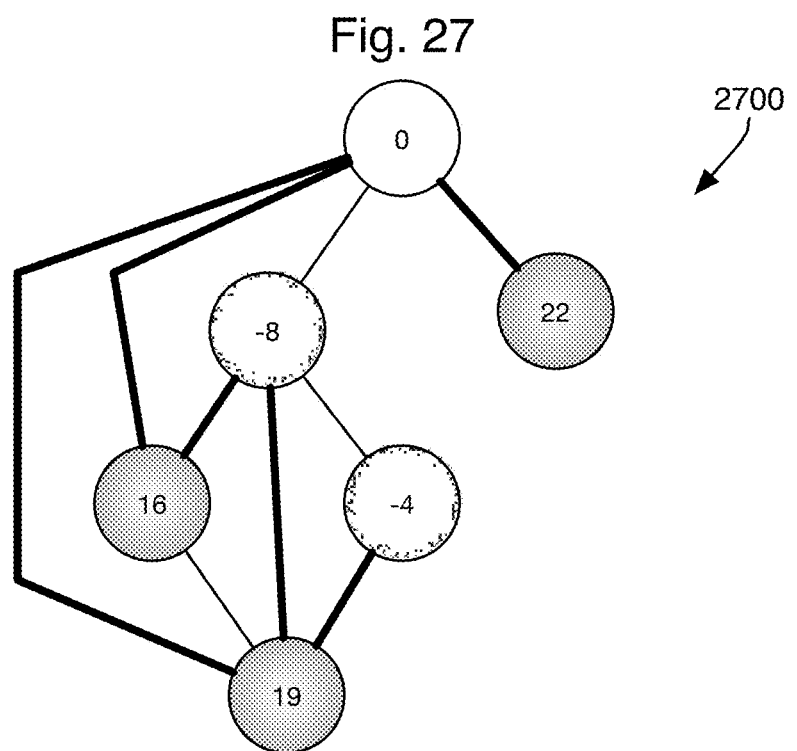
FIG. 27 is a schematic view of a final CSR structure.

Then next step is step 1750, which is irrelevant because all edges are part of T'. Step 1755 then prunes all vertices that are not the topmost vertex and have not been labeled "Stay" by step 1735, which results in structure 2600, as shown in FIG. 26. Step 1760 then removes all faint transitive edges, which results in structure 2700 of FIG. 27. The TERP evaluation and removal is next performed at steps 1765 and steps 1770, but the parameters above for CSR structures indicates that the TERP choice is free. This means users are allowed to alter the TERP rule, as explained above in connection with FIGS. 11 and 12. Thus, the structure 2700 of FIG. 27 comprises a CSR structure, and can be colored and labeled as desired.

For the generation of a DSR (such as DSR structure 1400), the three parameters are set as follows:

1) Edge Filter (F): is true if and only if e=(v, w) has the largest value among all edges of the form (v, u), with arbitrary u. This is determined based on the absolute value of the difference.
2) Edge Score Evaluation (ESE): is true if and only if the value of "e" is among the k largest values of edges in T'. In this case, the value of an edge is the absolute value of the difference between its endpoint values.
3) Transitive Edge Removal Policy (TERP): The TERP choice is free.

Thus, the ESE and TERP for a DSR are identical to that of the CSR, with the only difference being in the edge filter.

Figure 28:
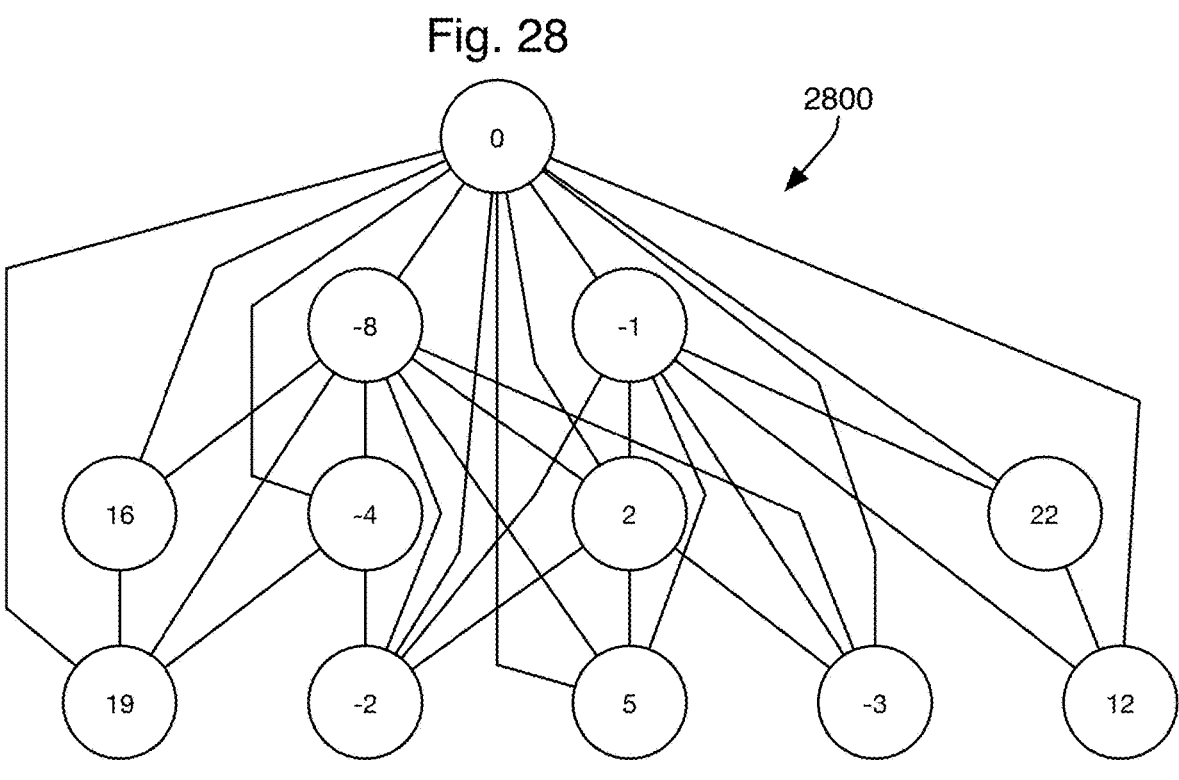
FIG. 28 is a schematic view of another transitive closure with vertex values.
Figure 29:
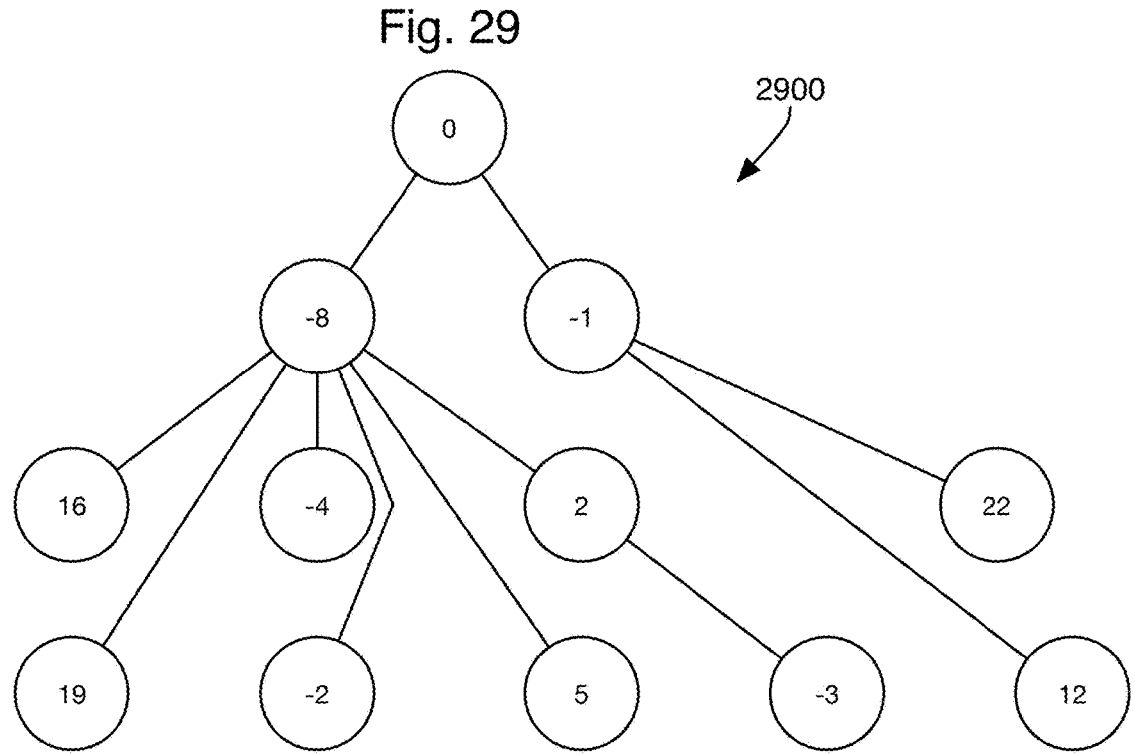
FIG. 29 is a schematic view of the structure of FIG. 28 showing a subset of edges.

Assuming the same data set used to describe the application of the CSR parameters described above, the transitive closure 2800 shown in FIG. 28 will be created at step 1705 using the DCR parameters. This is the same transitive closure 1800 produced above as shown in FIG. 18. But the application of the DSR edge filter at step 1710 will create a different result. According to this edge filter, the only upward directing edge from any given vertex that will return a true value is if the value of the edge is the largest when compared to all other edges stemming from that vertex. The result of this application is a T' set of edges 2900 as shown in FIG. 29.

Figure 30:
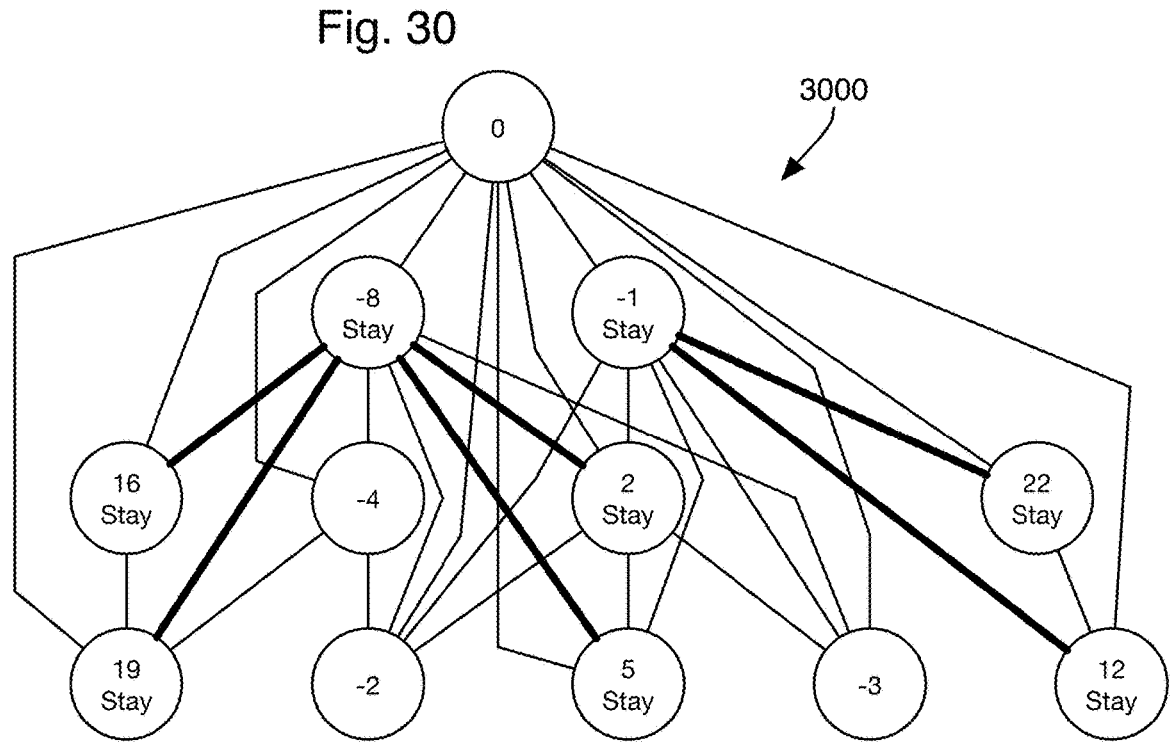
FIG. 30 is a schematic view of the structure of FIG. 28 showing bolded edges.
Figure 31:
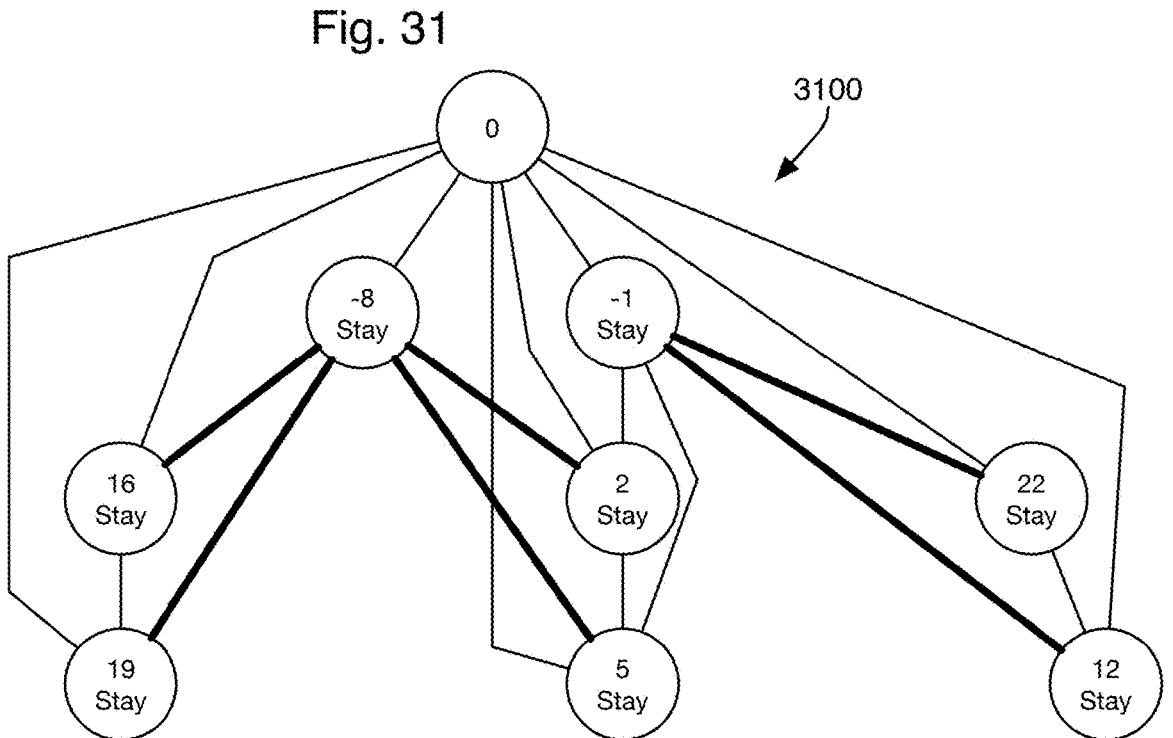
FIG. 31 is a schematic view of the structure of FIG. 30 after pruning.
Figure 32:
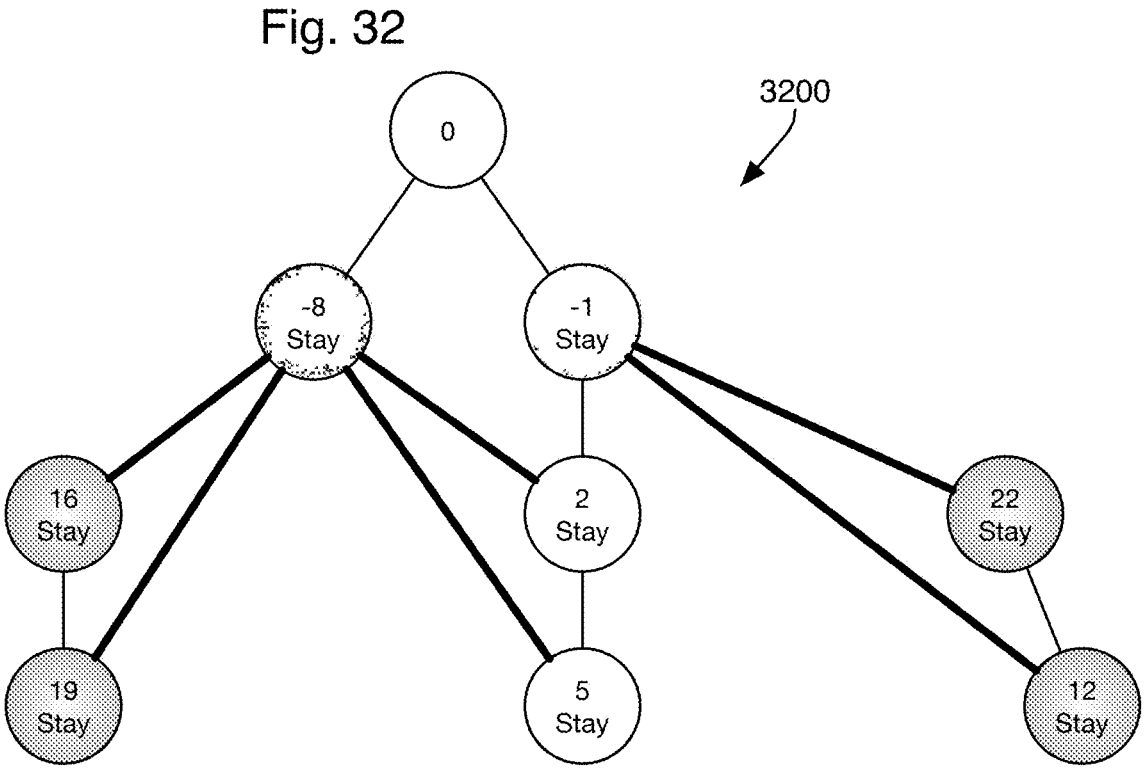
FIG. 32 is a schematic view of a final DCR structure.

Steps 1725-1745 will then apply the DCR edge score evaluation to the edges in the T' set of edges 2900. If k=6 again, six edges will be bolded, and their vertices will be marked as Stay. Next, step 1750 marks all edges not in T' faint, which results in structure 3000 as shown in FIG. 30. Step 1755 next removes all vertices that are not topmost or marked as stay, resulting in structure 3100 as shown in FIG. 31. Next, step 1760 removes all faint transitive edges, which results in structure 3200 shown in FIG. 32. As with the application of CSR rules, the DCR rules indicate that the TERP choice is free, meaning that FIG. 32 shows the created DCR structure 3200, which can be labeled and colored as appropriate.

The active cores created by method 1700 are an example of topped structures. In other words, it always has a maximum element, namely the topmost vertex. Indeed, step 1755 of the method 1700 avoids removing such element even if it is not incident to any outstanding edge. The reason for this is that the meaning of the topmost vertex is somewhat special, in that it conveys aggregate value information about the entirety of the portfolio. This is important enough that the interface element 240 in the user interface 210 should always display this vertex.

An obvious implication of being topped is that an active core always has at least one vertex. Of course, it may happen that such vertex is the only one. In this case, the active core would be trivial as it would reveal no information except for the overall portfolio statistics shown in connection with that one vertex.

Active Cores with Other Edge Score Evaluations (ESEs)

Up to now we have focused on one particular case of a more general idea. Namely, that the ESE only considers the difference between two values associated with the connected vertices, either in absolute value terms (e.g., CSR) or not (e.g., SGR, DCR). In this section, we will present another example of edge score evaluation. The motivation comes from situations in which one wants to consider how such values (returns) are dispersed over time: that is, what their variances (or equivalently, standard deviations) are.

Figure 33:
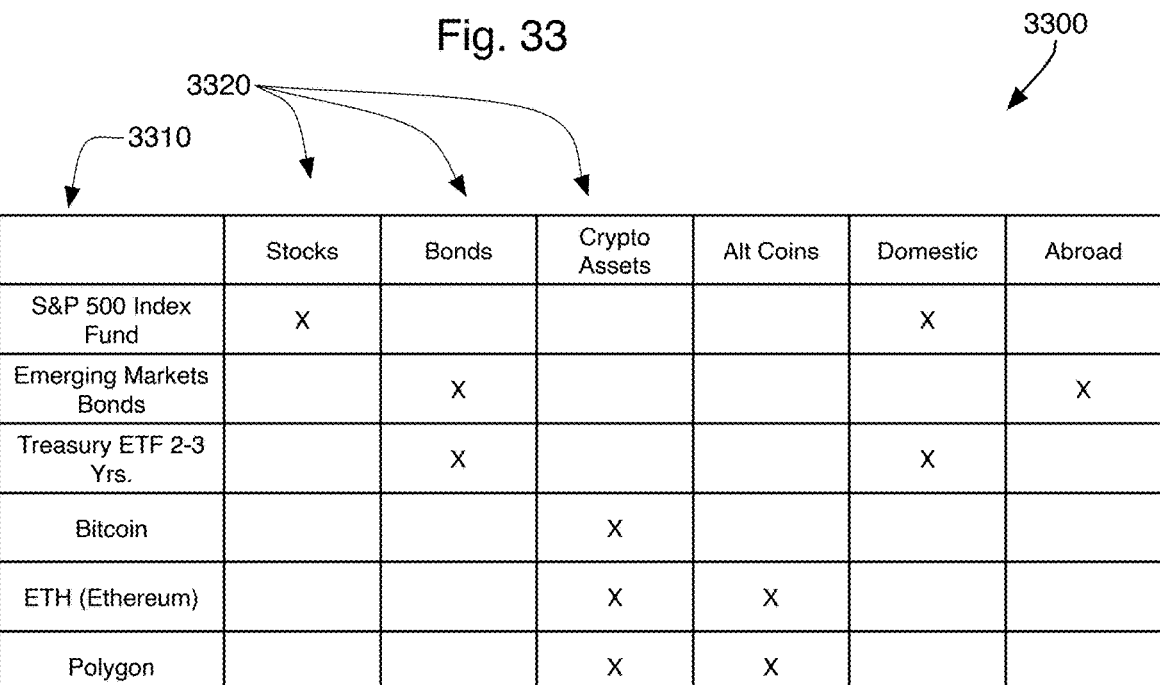
FIG. 33 is another data table of assets.

FIG. 33 shows a portfolio that is also constructed of financial assets, like that of FIG. 3. The portfolio is again presented as a table 3300, this time of six assets 3310 and six binary attributes 3320. A realistic example of how values could develop for this portfolio after five days is presented as structure 3400 in FIG. 34. In one embodiment, the user interface 210 uses rounded rectangles inside the vertices to convey volatility information. This can be seen in FIG. 35, which shows an enlarged view of the Crypto Asset vertex 3410 with the rounded rectangle 3500. In one embodiment, the width of the rounded rectangle 3500 is directly proportional to the standard deviation of the returns of the portfolio 3410 in which it is found. Such standard deviations may refer to the observed period (e.g., five days) or, what is more common, refer to a curated time period. Such time period is longer and should reflect the current regime of financial markets. There is not only one, but many ways to build such a curated time period. On the one hand, the period must be long enough to avoid reflecting temporary conditions; on the other, it should not be too long as to reflect old regimes which are not at play in markets anymore. Moreover, extreme events that caused external shocks such as the coronavirus pandemic should either be removed from the period or smoothed in order for its significance not to overwhelm the real volatilities.

In annualized terms, the volatility of the whole portfolio 3420 is 20%, whereas the subportfolio {"crypto asset"} 3410 presents a volatility of 60%. Now, consider the edge "b" between Crypto Assets 3410 and Alt Coins 3430 in FIG. 34. Even though the value difference between these two vertices 3410, 3430 is high (a 4.9% difference), it is less extraordinary when we consider that "crypto asset" has a five-day volatility of around 8.45% (i.e., 60% annually). Therefore, an ESE that takes into account volatility should not be myopic to the fact that a 4.9% move does not mean that much for a group of assets that is so volatile. This example illustrates that if one uses an ESE that only depends on the difference of returns between vertices, this will skew favorably the presence of edges relating to very volatile assets. This is mitigated when one uses, for example, the ESE 3600 shown in FIG. 36. There, we chose a rational number "k" (typically ranging from one to six) and defined an ESE with the following meaning: the edge "e" is considered "outstanding enough" to be true under the ESE if and only if the value of y differs from the value of x by k times its standard deviation (where the excess is in absolute value terms). This corresponds to a common statistical technique called Z-Scoring.

Figure 34:
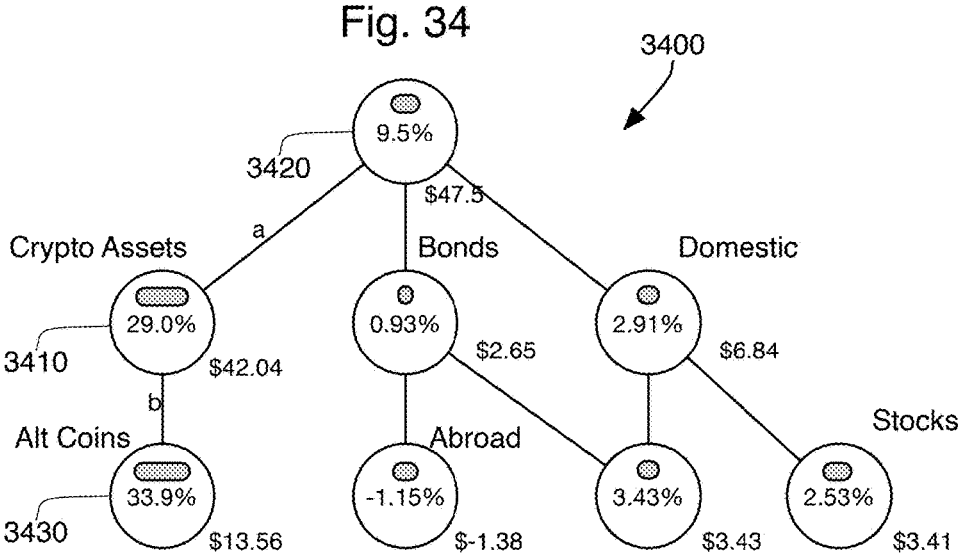
FIG. 34 is a schematic view of a structure showing vertices with rounded rectangles reflecting a volatility of vertex values.
Figures 35, 36:
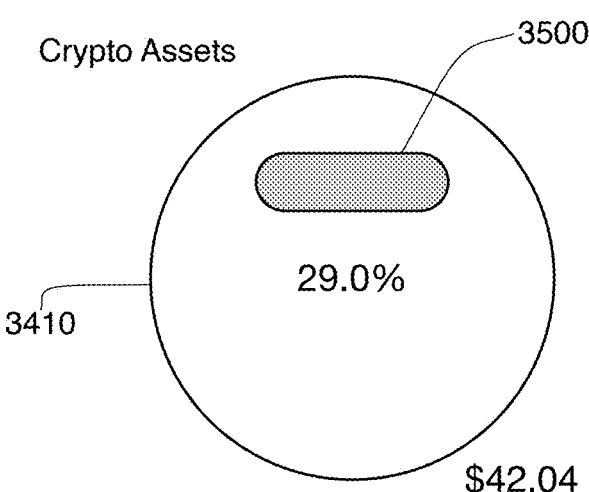
FIG. 35 is a schematic view of a vertex from FIG. 34.
FIG. 36 is a schematic view of an edge for aid in specifying an edge score evaluation.

Another way of phrasing what is shown in FIG. 36 is to say that the Z-Score of an edge "e" is, by definition, $|y-x|/std\_dev(x)$. The edge passes the ESE when this amount is larger than the fixed threshold k. Returning to FIG. 34, this Edge Score Evaluation would favor the edge "a" (between vertices 3420 and 3410) immensely more than the edge "b" (between vertices 3430 and 3420). More precisely, the Z-Score of "a" is approximately twelve times larger than the one of "b", while their value differences are only at a fourfold proportion to each other. Note that in the transitive closure of the structure of FIG. 34, the edge between "altcoins" and the topmost element also has a high Z-Score. Let "c" be the name of such edge. If one wishes to diminish the influence of "c", one could use an edge filter (to nullify the influence of "c" completely) or use an even more refined ESE; one which recognizes the triangle formed by "a", "b", and "c" and penalizes the edge "c" because its Z-Score is not materially different from that of "a". Under such conditions, the portfolio {"altcoins", "crypto asset"} would not be present in the active core. This is a plausible goal since, in this example, its volatility-adjusted returns are very similar to that of {"crypto asset"}.

Graphical User Interface Elements

Main Dialogues

As we have seen above, active cores have three parameters. They drive which aspect of the data is to be highlighted. The way a user of the user interface 210 can interact with a monitoring system can be along the lines of an additional user interface element 3700, as shown in FIG. 37.

One of the main user inputs that a user can control through interface element 3700 is the observation period 3710, which is made up of "observation begin" data entry 3712 and "observation end" data entry 3714. Whereas the first data entry 3712 is a mandatory input, the second one 3714 is optional. When the user provides both, then two modes of observation are possible: snapshot and playback. In snapshot mode, the unique active core associated with the given period gets displayed as interface element 240 on the user interface 210. In other words, the displayed active core in interface element 240 is static.

In playback mode, the user watches all the intermediary active cores dynamically change over time, as if time were passing from observation begin time 3712 until the observation end time 3714, in a manner analogous to a motion picture. The first displayed active core under playback is possibly trivial (this will be the case if the ESE requires that edge values exceed a threshold. It will not be the case if the ESE only selects the "k" largest edge values, independently of their specific values). With the passage of time, the displayed structure gains complexity with vertices and edges being added and removed over time. At each intermediate time shown, method 1700 will determine the displayed structure by identifying the active cores for display. The time increment for such playback functionality is given by the option "Playback step" 3720. The user may fast forward, rewind and pause (as is described below). The option for "live monitoring" 3730 is similar to "playback" in that multiple time increments are used to determine the active cores to be displayed at any given time. The difference is that, in live monitoring, the observation end input 3714 is not input and implicitly taken as the current (real) time. In this mode, the displayed active cores are continuously updated and refer to the time interval [observation begin, now].

In FIG. 37, we show two possibilities to input active core parameters 3740, namely preset 3742 and custom 3744. The latter is a quite expressive approach that is very powerful. However, the ability to create custom parameters 3744 frequently requires some user training, since it has free text fields that parse formulas that are close to a mathematical expression. The example given in FIG. 37 is that the ESE determines if an edge is outstanding/bold if its value is at least 1% and the Z-Score is at least two.

When the user chooses "Preset" instead, then one among "SGR", "CSR" and "DCR" must be selected, as well as the so-called ranks 3750. The primary rank 3752 is the number of the largest values that should be displayed. The secondary rank 3754 refers to the number of the smallest values that should be displayed. For example, FIG. 8 shows an SGR structure 800 having primary rank=secondary rank=5. In the SGR structure 1000 in FIG. 10, the primary rank 3752 equals eight, and the secondary rank equals zero. The same values hold for the DCR structure 1400 of FIG. 14.

After defining dataset and active core parameters, the visualization begins. At any point in time, the user may adjust visualization options, which are shown in the interface element 3800 in FIG. 38. Element 3810 allows the user to show or hide supports. In this context, a "support" is the general technical term for the subportfolio weight concept of finance. This corresponds to the circular arc 750 described above in connection with FIG. 7. Interface element 3820 controls the visibility of volatility, which controls whether the rounded rectangle 3500 shown in FIGS. 34 and 35 is shown. Furthermore, as described above, the system 100 includes the ability to allow a user to reveal any transitive edges that were removed by the TERP. Interface element 3830 allows the user to select whether they are re-displayed by hovering over the applicable area, clicking on a vertex, or never.

Pagination

Figure 39:
FIG. 39 is a schematic view of a user interface element.

FIG. 39 shows interface element 3900 that can be used to see additional data when viewing a graphical structure in interface element 240. This element provides the ability to move through data in a way that is analogous to the result page of a search engine. The user may choose to explore the other, lower ranked differences by means of a mouse click on the right-facing arrows of the interface element 3900. For example, in FIG. 10, CSR structure 1000 shows the top eight ranked edges. If interface element 3900 were included on the interface element 240 when viewing CSR structure 1000, clicking on a single arrow would progress the user one further through the rankings by showing the edges ranked 2-9 (as opposed to edges 1-8 as shown in FIG. 10). The result is the CSR structure 4000 shown in FIG. 40. If the double arrows would have been clicked, then the edges ranked 9-16 would have been shown.

Individual Portfolio Inspection

Figure 40:
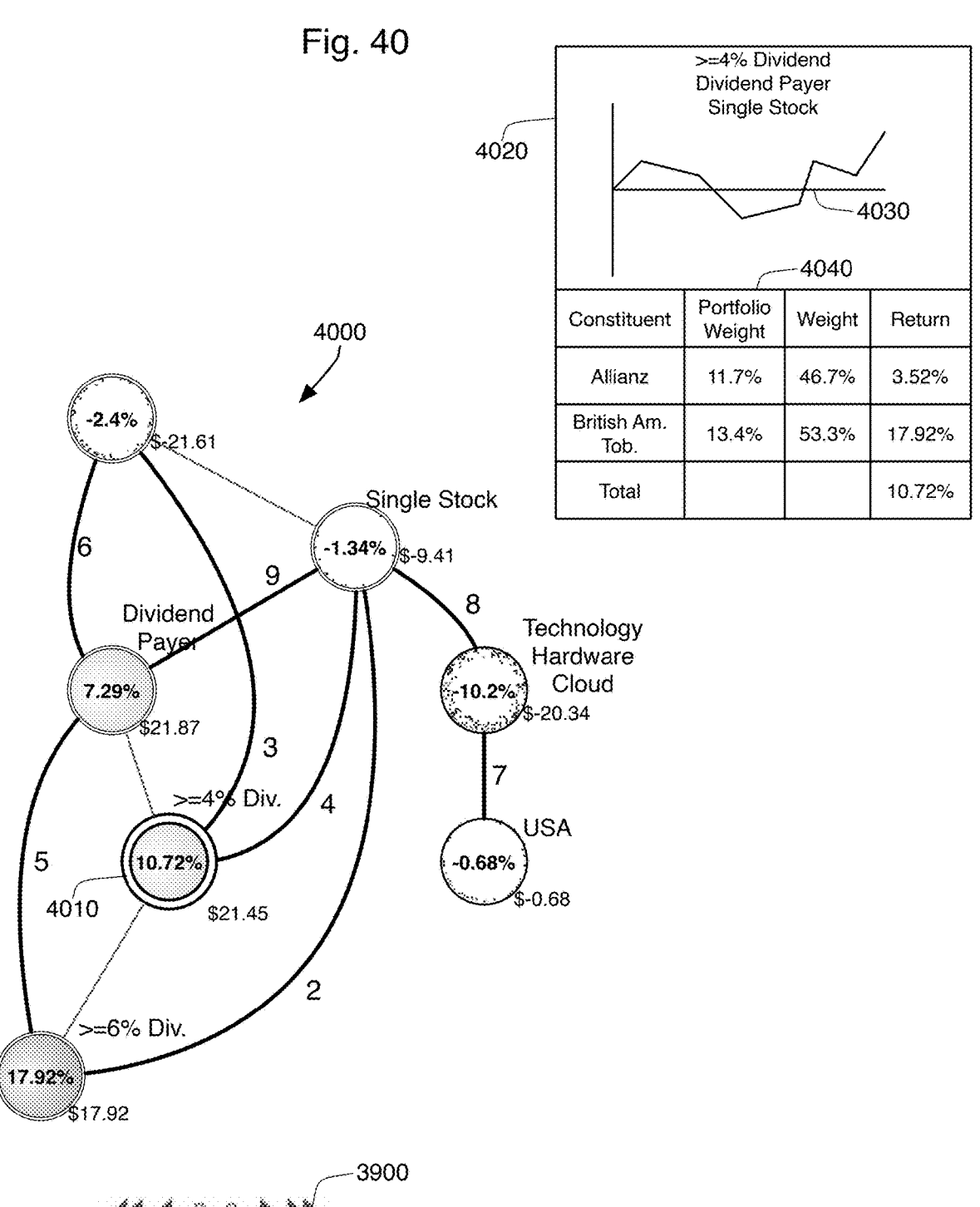
FIG. 40 is a schematic view of a user interface containing a graphical representation of data.

Oftentimes a user wants to look more closely into a subportfolio to examine its return across the observed period. Another object of interest may be its constituents, allowing a closer look at the individual assets. An example of this is seen in FIG. 40, where the user has selected the vertex labeled ">=4% div." 4010 for inspection. The selection can occur simply by using a mouse to click on this vertex 4010, or by using a contextual menu that appears after clicking on the vertex. The selection of a subportfolio in this manner causes its vertex 4010 to alter in appearance so that it is clear which subportfolio has been selected. In FIG. 40, an outermost circumference around the vertex 4010 is shown, which can also be colored in a manner to visually distinguish it from other vertices in the structure 4000. In some embodiments, the subportfolios that are comparable to the selected subportfolio 4010 can also be visually distinguished, which is also shown in FIG. 40.

When a vertex 4010 has been selected, details about that subportfolio are provided. In FIG. 40, an inspection window 4020 is displayed along with the CSR structure 4000. In this example, a timeseries graph 4030 of the performance of the subportfolio over time is shown. In addition, a table 4040 showing the individual assets in the subportfolio and their weights is also presented. In table 4040, the subportfolio assets are shown as the set {"Allianz", "British American Tobacco"}.

In the table 4040, the phrase "portfolio weight" refers to the asset's current value as a proportion of the whole portfolio's current value. Similarly, "weight" means the asset's current value as a proportion of the subportfolio's current value. Observe that, at the beginning of the period, each asset had a portfolio weight of approximately 11.1%. Indeed, the capital invested in each of the nine assets was the same ($100). Because market prices moved, those weights will not be the same at the end of the observation period. This fact can be learned from the weights represented in table 4040.

Auxiliary GUI Components-Edge Zoom: Subportfolio/Superportfolio Inspection

Figure 41:
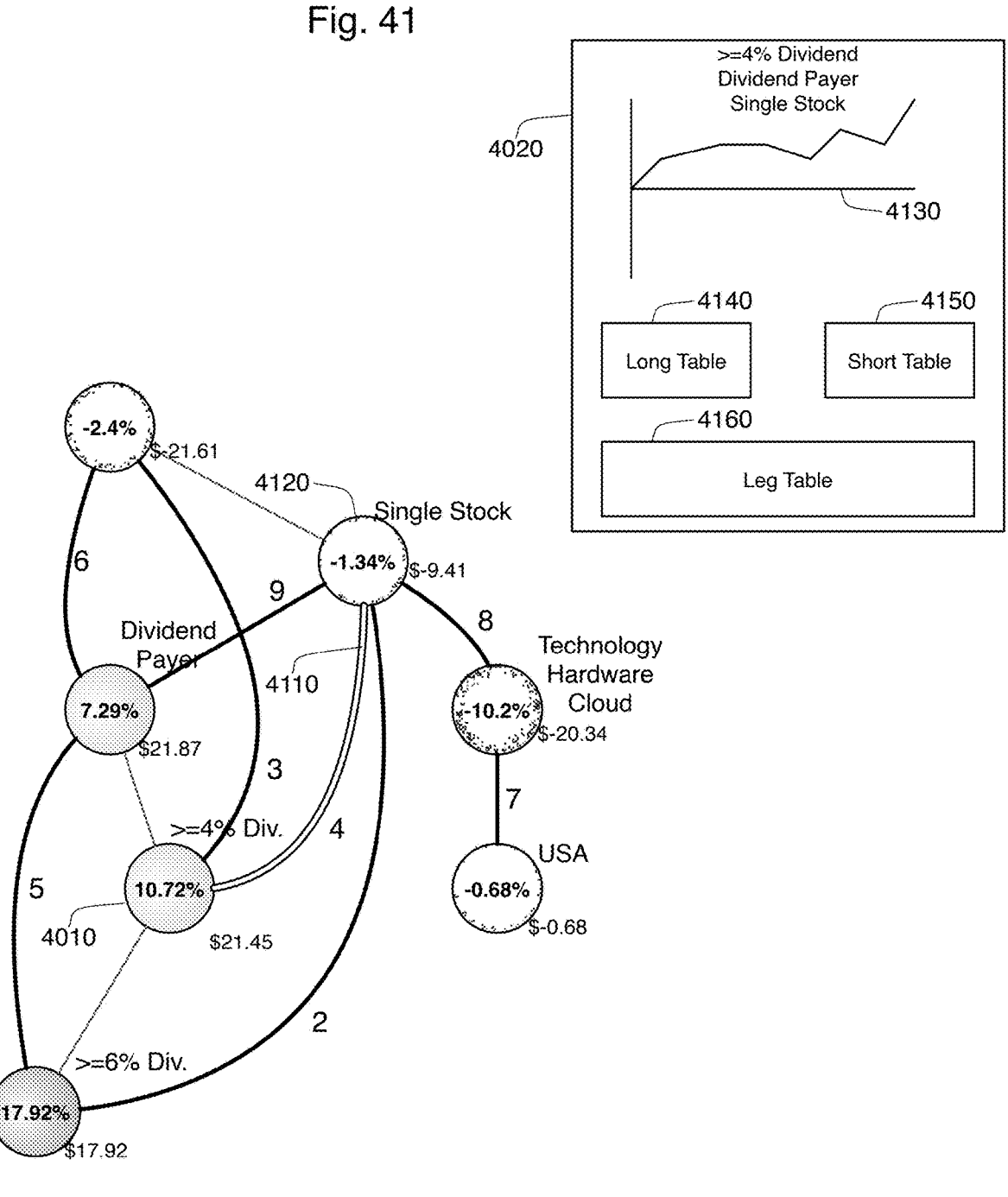
FIG. 41 is a schematic view of another user interface containing a graphical representation of data.

When the active core measures differences between comparable subportfolios (e.g. if it is a CSR structure 1000 or a DCR structure 1400), it makes sense to allow the user to rapidly observe the relative performance of two comparable subportfolios. This can be accomplished by selecting an edge for inspection. In FIG. 41, edge 4110 has been selected, which has the fourth largest difference in the entire portfolio. The subportfolio labeled ">=4% div" 4010 has outperformed its superportfolio labeled "single stock" 4120. By clicking on the edge 4110, the inspection window 4020 gets rendered and displayed on the GUI. As in FIG. 40, we have a performance graph 4130. This time, however, the graph shows the performance of having bought the subportfolio and sold the underperforming portion of the superportfolio. This is an example of what is known in the industry as a long/short trade. The "long" refers to the assets which are to be bought. The "short" refers to the ones that are to be sold. As a side note: an entity does not have to own an asset first, in order to sell it later. It is possible to enter a short position without first owning an asset. The inspection window 4020 shows the economic performance of having acquired positive exposure to the outperforming subportfolio and negative exposure to the underperforming portion of the superportfolio.

The inspection window 4020 also contains a "long table" 4140 of all of the assets in the outperforming subportfolio 4010. This long table will contain the same assets as the table 4040 of FIG. 40, which both tables present information about the assets of vertex 4010. The short table 4150 contains a list of the underperforming portion of the superportfolio 4120. The short table may reflect the "short" returns that would be applicable if short positions had been taken on these assets. "Short" returns are, by convention, multiplied by minus one (turning losses into gains), so that they reflect the profit/loss of the entity that took the selling side of the trade. The "long" and "short" parts of the trade are also called its legs. The performance of both legs, combined, is visible in the leg table 4160. It is interesting to let the Leg Weights be 50% at first, which reflects having equal stakes in the long and short positions. In some embodiments, the user is allowed to override this value, according to his/her judgment and appetite for going short. This is because entering a short trade typically requires more diligence and care, since the theoretical maximum loss is unbounded.

Textual Description in Playback Mode

When using the interface in playback or live monitoring mode, it can be useful to have a natural language component. This component 4200 is shown in FIG. 42 beneath CSR structure 1000. The purpose of this natural language component 4200 is to describe with phrases how the active core evolved at each playback step. Consider a typical example while the system 100 is providing a playback observation. The first displayed active core is a trivial structure. With the passage of time, it evolves and acquires edges and vertices (as well as loses some of these). These structures get constantly redrawn on screen. The textual description in component 4200 can inform what changed from one step to the other and is sensitive to portfolios that stay a long time throughout the observation, as well as perceive which ones just flash and disappear quickly. One use case for this textual description is when the user's attention gets drawn to something else, and afterwards they come back to the monitoring interface. With the textual element, the person is always able to read the transcript of what happened during the time their attention was devoted to something else. The textual description may contain timestamps, including a real-time timestamp relating to the data being analyzed. In addition, it is possible to record an observed-time timestamp in order to provide a temporal orientation to the user.

If the component 4200 is able to perceive which vertices stayed longer and which ones just flashed, this can provide a useful filtering functionality. Such ability can prove useful for active cores that change very often. For example, if a vertex is added into a structure that previously had been very stable, the component 4200 can record this appearance with a description. Similarly, if a vertex that had been stable is no longer in the structure displayed in the interface element 240, this can trigger a descriptive phrase.

Abbreviation of Attributes

There is, in general, more than one way to describe a portfolio with words. One way is to use the exhaustive list of all the attributes the portfolio has. For example, {">=6% div", ">=4% div", "dividend payer"} describes the portfolio represented by vertex 4210. However, this full list is not necessary. Notice that ">=6% div" describes the portfolio just as well, since ">=4% div" and "dividend payer" are implied attributes from the currently displayed structure 1000. It may be useful for such a text-based widget to represent portfolios by using minimal sets of attributes. The motivation for this is to keep textual descriptions short, minimizing human cognitive costs. This abbreviation by attributes can be controlled through user preferences or through pop-up interface elements associated with the component 4200. Note that the underlying data associated with each entry in the component 4200 can be maintained, so that a change in user preferences (to never abbreviating attributes, for instance) can alter previously created entries into the component 4200.

In active cores, attributes may stack up on the upper right labels of vertices. There is nothing, in principle, preventing a vertex from receiving a large number of attribute labels. To avoid cluttering, a graphical user interface should, therefore, be prepared to present scrolling widgets on said label elements. This is done in such a way that it limits the simultaneous display of attributes to a small value (for example, five).

Besides scrolling, there is another important technique at one's disposal, which was introduced in the previous paragraph: namely, attribute abbreviation. Consider, for example, vertex 4220, which includes both the "technology" and "hardware" labels. In the present example, all assets with the attribute hardware will, by default, also have the attribute technology. It is therefore redundant to label vertex 4220 with "technology" if it already has the label "hardware." Similar hierarchical relationships for attributes are common. For example, it is generally unnecessary to label a vertex with "Asia" if the label "Japan" is already applied.

Such attribute implications belong to common sense and form the background logic of the application. In this invention, hierarchical relationships between attributes can be identified in two ways. The first way is by allowing the human user to manually input pairs of attributes which are governed by this type of hierarchical relationship between attributes, such that all assets with attribute X (e.g., Japan) will always have attribute Y (e.g., Asia), even though the converse is not necessarily true. The second way is by making use of an LLM (large language model), or a similar Natural Language Processing (NLP) technique, in order to feed implication pairs to the system, thereby achieving the important goal of displaying the most concise structure possible on the screen.

APPLICABILITY

The examples given here with financial instruments form one instance of the general principle. Analogous applications are plentiful. In one alternative example, a marketing department of a large sportswear manufacturer could find the present disclosure useful. Such a manufacturer may hire hundreds of social media influencers to publish content portraying their products during a certain time period. Each post is associated with attributes (hashtags), such as "lifestyle", "health", "social impact", "summer", "mindfulness", and so on. The performance of each post can be captured via the number of interactions in the social media platforms, or actually any impact metric. It is interesting for such a company to monitor and discover attributes associated with posts which are performing particularly well (as well as the ones which are particularly disappointing). In this example, social media engagement metrics play the role of return (performance), and hashtags are analogous to financial asset attributes. Relationships could be defined in the hashtags to develop a transitive hierarchy.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computer-implemented method for generating an improved, dynamic computer user interface, the computer-implemented method comprising:

a) accessing data associated with a plurality of assets, each asset associated with an asset value and a plurality of binary attributes;

b) constructing a directed graph structure based on the plurality of binary attributes, the directed graph structure comprising:

i) a plurality of vertices, each vertex representing a subset of the assets that share one or more binary attributes, and each vertex having a vertex value based on the asset values of the subset of the assets; and ii) a plurality of edges connecting the vertices, wherein each edge connects two associated vertices;

c) displaying at least a portion of the directed graph structure on the user interface;

d) receiving user input through the user interface to guide a creation of an active core;

e) determining the active core of the directed graph structure by analyzing the vertex values associated with the plurality of vertices in accordance with the user input and selecting a selected subset of vertices based on that analysis to form the active core, thereby leaving an unselected subset of vertices that do not form part of the active core;

f) constructing a pruned structure based on the active core by removing the vertices that are part of the unselected subset; and g) revising the user interface to display the pruned structure such that the user interface aligns with the user input.

2. The computer-implemented method of claim 1, wherein further comprising creating a transitive closure of the directed graph structure by adding transitive edges between vertices based on existing edges in the directed graph structure, wherein determining of the active core of the directed graph structure comprises analyzing the transitive closure of the directed graph structure.

3. The computer-implemented method of claim 2, further comprising applying an edge filter to the transitive closure to select a T' subset of edges, and wherein the determination of the active core is performed by analyzing the vertex values associated with the vertices connected by the subset of edges selected by the edge filter.

4. The computer-implemented method of claim 3, wherein the subset of edges selected by the edge filter comprises less than all of the edges in the transitive closure.

5. The computer-implemented method of claim 3, further comprising applying an edge score evaluation (ESE) to the T' subset of edges, wherein the ESE identifies edges within the T' subset of edges that meet requirements defined by the ESE and marks the vertices connected by those identified edges as part of the selected subset of vertices and edges that form the active core.

6. The computer-implemented method of claim 5, further comprising marking the edges within the T' subset of edges that meet the requirements defined by the ESE, wherein a remaining set of edges in the T' subset of edges that do not meet the ESE's requirements are not marked.

7. The computer-implemented method of claim 6, wherein constructing the pruned structure further comprises removing the vertices that were not marked by the ESE as part of the selected subset of vertices, such that only the marked vertices remain in the pruned structure.

8. The computer-implemented method of claim 7, further comprising identifying all edges in the transitive closure of the directed graph structure that are not part of the T' subset of edges as unmarked, and removing all unmarked transitive edges from the pruned structure.

9. The computer-implemented method of claim 8, wherein the marked edges that meet the requirements defined by the ESE are visually bolded in the user interface.

10. The computer-implemented method of claim 8, further comprising applying a transitive edge removal policy (TERP) to the pruned structure, wherein the TERP removes at least one transitive edge that is marked.

11. The computer-implemented method of claim 10, wherein the TERP removes a marked transitive edge based on a number of marked edges in a triangle for which the marked edge is a hypotenuse.

12. A computing device comprising:

a) a memory, b) a processor configured to execute computer programming;

c) an interface device displaying a user interface; and d) the computer programming located in the memory instructing the processor to dynamically alter the user interface by instructing the processor to:

i) access data associated with a plurality of assets, each asset associated with an asset value and a plurality of binary attributes, ii) construct a directed graph structure based on the plurality of binary attributes, the directed graph structure comprising:

(1) a plurality of vertices, each vertex representing a subset of the assets that share one or more binary attributes, and each vertex having a vertex value based on the asset values of the subset of the assets, and (2) a plurality of edges connecting the vertices, wherein each edge connects two associated vertices;

iii) display at least a portion of the directed graph structure on the user interface, iv) receive user input through the user interface to guide a creation of an active core, v) determine the active core of the directed graph structure by analyzing the vertex values associated with the plurality of vertices in accordance with the user input and selecting a selected subset of vertices based on that analysis to form the active core, thereby leaving an unselected subset of vertices that do not form part of the active core, vi) construct a pruned structure based on the active core by removing the vertices that are part of the unselected subset, and vii) revise the user interface to display the pruned structure such that the user interface aligns with the user input.

13. The computing device of claim 12, wherein the computer programming further instructs the processor to create a transitive closure of the directed graph structure by adding transitive edges between vertices based on existing edges in the directed graph structure, wherein determining of the active core of the directed graph structure comprises analyzing the transitive closure of the directed graph structure.

14. The computing device of claim 13, wherein the computer programming further instructs the processor to apply an edge filter to the transitive closure to select a T' subset of edges, and wherein the determination of the active core is performed by analyzing the vertex values associated with the vertices connected by the subset of edges selected by the edge filter.

15. The computing device of claim 14, wherein the computer programming further instructs the processor to apply an edge score evaluation (ESE) to the T' subset of edges, wherein the ESE identifies edges within the T' subset of edges that meet requirements defined by the ESE and marks the vertices connected by those identified edges as part of the selected subset of vertices and edges that form the active core.

16. The computing device of claim 15, wherein the computer programming further instructs the processor to mark the edges within the T' subset of edges that meet the requirements defined by the ESE, wherein a remaining set of edges in the T' subset of edges that do not meet the ESE's requirements are not marked.

17. The computing device of claim 16, wherein the computer programming further instructs the processor to construct the pruned structure by removing the vertices that were not marked by the ESE as part of the selected subset of vertices, such that only the marked vertices remain in the pruned structure.

18. The computing device of claim 17, wherein the computer programming further instructs the processor to identify all edges in the transitive closure of the directed graph structure that are not part of the T' subset of edges as unmarked, and removing all unmarked transitive edges from the pruned structure.

19. The computing device of claim 18, wherein the computer programming further instructs the processor to apply a transitive edge removal policy (TERP) to the pruned structure, wherein the TERP removes at least one transitive edge that is marked.

20. A computer-implemented method for generating an improved, dynamic computer user interface, the computer-implemented method comprising:

a) accessing data associated with a plurality of assets, each asset associated with an asset value and a plurality of binary attributes, wherein the asset values change over time;

b) constructing a directed graph structure based on the plurality of binary attributes, the directed graph structure comprising:

i) a plurality of vertices, each vertex representing a subset of the assets that share one or more binary attributes, and each vertex having a vertex value that updates over time based on changes to the asset values of the subset of the assets; and ii) a plurality of edges connecting the vertices, wherein each edge connects two associated vertices;

c) displaying at least a portion of the directed graph structure on the user interface;

d) receiving user input through the user interface to guide a creation of an active core;

e) determining the active core dynamically by analyzing the vertex values associated with the plurality of vertices in accordance with the user input and selecting a selected subset of vertices based on that analysis to form the active core, wherein the selected subset is updated in real-time as vertex values change over time, thereby leaving an unselected subset of vertices that do not form part of the active core;

f) constructing a pruned structure based on the active core by removing the vertices that are part of the unselected subset; and g) automatically revising the user interface over time to reflect changes in underlying data by updating the displayed vertices and edges in the pruned structure in response to changes in the active core over time.

* * * * *